(12) United States Patent
Shirai

(10) Patent No.: US 9,669,900 B2
(45) Date of Patent: Jun. 6, 2017

(54) CHAIN TENSIONING DEVICE

(71) Applicant: Shimano Inc., Sakai, Osaka (JP)

(72) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 196 days.

(21) Appl. No.: 14/686,148

(22) Filed: Apr. 14, 2015

(65) Prior Publication Data
US 2016/0304161 A1    Oct. 20, 2016

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/16 | (2006.01) |
| B62M 9/126 | (2010.01) |
| F16H 7/12 | (2006.01) |
| B62M 9/00 | (2006.01) |
| F16H 7/08 | (2006.01) |

(52) U.S. Cl.
CPC .............. B62M 9/16 (2013.01); B62M 9/126 (2013.01); F16H 7/1236 (2013.01); B62M 2009/007 (2013.01); F16H 2007/081 (2013.01); F16H 2007/087 (2013.01); F16H 2007/0893 (2013.01)

(58) Field of Classification Search
CPC ...... B62M 9/16; B62M 9/1248; B62M 9/126; B62M 9/121; B62M 9/122
USPC ...................................... 474/80, 82
See application file for complete search history.

(56) References Cited

U.S. PATENT DOCUMENTS

| | | | | |
|---|---|---|---|---|
| 6,135,904 A | * | 10/2000 | Guthrie | B62M 9/126 474/82 |
| 8,870,692 B2 | * | 10/2014 | Yamaguchi | B62M 9/126 474/80 |
| 8,870,693 B2 | * | 10/2014 | Shahana | B62M 9/121 474/80 |
| 8,900,078 B2 | * | 12/2014 | Yamaguchi | B62M 9/122 474/80 |
| 9,290,235 B2 | * | 3/2016 | Yamaguchi | B62M 9/1244 |
| 9,377,089 B2 | * | 6/2016 | Yamaguchi | B62M 9/16 |

(Continued)

FOREIGN PATENT DOCUMENTS

| | | |
|---|---|---|
| JP | 2-296024 A | 12/1990 |
| JP | 3-267027 A | 11/1991 |

(Continued)

*Primary Examiner* — Henry Liu
(74) *Attorney, Agent, or Firm* — Global IP Counselors, LLP

(57) ABSTRACT

A chain tensioning device includes a main body, a chain guide and a rotary fluid damper unit. The chain guide is pivotally coupled to the main body to rotate around a rotational axis with respect to the main body. The rotary fluid damper unit is operatively connected between the main body and the chain guide to provide rotational resistance to the chain guide around the rotational axis. The rotary fluid damper unit includes at least one primary flow limiting valve and at least one support member. The primary flexible valve portion of the at least one primary flow limiting valve is configured to flex and contact the at least one support member to form a primary flow path between a free end of the primary flexible valve portion of the at least one primary flow limiting valve and the other of the first and second members.

17 Claims, 17 Drawing Sheets

(56) References Cited

U.S. PATENT DOCUMENTS

| | | | | |
|---|---|---|---|---|
| 9,463,846 B2* | 10/2016 | Chang | ................... | B62M 9/121 |
| 2007/0219029 A1* | 9/2007 | Turner | ................... | B62M 9/16 |
| | | | | 474/80 |
| 2008/0026890 A1* | 1/2008 | Oseto | ................... | B62M 9/1242 |
| | | | | 474/82 |
| 2008/0026891 A1* | 1/2008 | Oseto | ................... | B62M 9/1242 |
| | | | | 474/82 |
| 2012/0258827 A1* | 10/2012 | Ishikawa | .............. | B62M 9/1248 |
| | | | | 474/80 |
| 2013/0203532 A1* | 8/2013 | Jordan | ................ | B62M 9/1248 |
| | | | | 474/82 |
| 2015/0072816 A1* | 3/2015 | Yamaguchi | ........... | F16H 7/0829 |
| | | | | 474/113 |

FOREIGN PATENT DOCUMENTS

| | | | |
|---|---|---|---|
| JP | 5-044761 A | 2/1993 | |
| JP | 7-301272 A | 11/1995 | |
| JP | 11-082593 A | 3/1999 | |
| JP | 2008-008418 A | 1/2008 | |
| WO | 2007/106867 A2 | 9/2007 | |

* cited by examiner

CHAIN TENSIONING DEVICE

BACKGROUND

Field of the Invention

This invention generally relates to a chain tensioning device. More specifically, the present invention relates to a chain tensioning device that is provided with a damper unit, which slows sudden movement of the chain guide in at least one direction.

Background Information

A bicycle typically uses a chain drive transmission for transmitting a pedaling force to a rear wheel. Many bicycle chain drive transmissions either use an internally geared hub or a pair of derailleurs to selectively change speeds. In the case of an internally geared hub, a chain tensioning device (also called a chain tensioner) is used to keep the proper tension on the chain. In the case of a chain drive transmission using a pair of derailleurs, the rear derailleur is usually configured to provide the proper tension on the chain. Thus, the rear derailleur is a type of a chain tensioning device that is also used to shift the chain between rear sprockets.

In some cases, a chain tensioning device is provided with a damper to slow changes in chain tension. An example of a chain tensioning device that is provided with a damper is disclosed in International Patent Application Publication No. WO 2007/106867. The chain tensioning device disclosed in this international patent application publication is a rear derailleur in which the damper includes a one-way valve to slow changes in chain tension in one rotational direction of the chain guide more than the other rotational direction of the chain guide. Another example of a rear derailleur (i.e., a chain tensioning device) is disclosed in U.S. Pat. No. 6,135,904.

SUMMARY

Generally, the present disclosure discloses various features of a chain tensioning device for a bicycle. As mentioned above, a chain tensioning device (also called a chain tensioner) is used to keep the proper tension on a chain that is used in a bicycle chain drive transmission. In one feature, the chain tensioning device is provided that includes a main body, a chain guide pivotally coupled to the main body and a rotary fluid damper unit that provides rotational resistance to the chain guide around a rotational axis.

In view of the state of the known technology and in accordance with a first aspect of the present disclosure, a chain tensioning device is provided that basically comprises a main body, a chain guide and a rotary fluid damper unit. The main body is configured to be mounted to a bicycle. The chain guide is pivotally coupled to the main body to rotate around a rotational axis with respect to the main body. The rotary fluid damper unit is operatively connected between the main body and the chain guide to provide rotational resistance to the chain guide around the rotational axis. The rotary fluid damper unit includes a housing, at least one primary flow limiting valve and at least one support member. The housing includes a first member that is fixed to one of the main body and the chain guide, and a second member that is fixed to the other of the main body and the chain guide. The first member is disposed inside of the second member to define a fluid cavity that is filled with a fluid. The at least one primary flow limiting valve has a primary attachment portion attached to one of the first and second members and a primary flexible valve portion. The at least one support member is attached to the one of the first and second members. The at least one support member is located on a circumferential side of the at least one primary flow limiting valve. The primary flexible valve portion of the at least one primary flow limiting valve is configured to flex and contact the at least one support member to form a primary flow path between a free end of the primary flexible valve portion of the at least one primary flow limiting valve and the other of the first and second members.

In accordance with a second aspect of the present invention, the chain tensioning device according to the first aspect is configured so that the at least one support member includes a convex contact surface that faces the at least one primary flow limiting valve. The convex contact surface is positioned to limit flexing of the at least one primary flow limiting valve towards an open position that establishes the flow path.

In accordance with a third aspect of the present invention, the chain tensioning device according to the first aspect is configured so that the second member is fixed to the main body, and the first member is fixed to the chain guide. The first member is rotatably disposed inside of the second member.

In accordance with a fourth aspect of the present invention, the chain tensioning device according to the third aspect is configured so that the first member includes a mounting portion that extends outside of the second member in an axis direction of the rotational axis, and the chain guide is mounted to the mounting portion of the first member.

In accordance with a fifth aspect of the present invention, the chain tensioning device according to the third aspect is configured so that the at least one primary flow limiting valve and the at least one support member are attached to the first member.

In accordance with a sixth aspect of the present invention, the chain tensioning device according to the third aspect is configured so that the at least one primary flow limiting valve and the at least one support member are attached to the second member.

In accordance with a seventh aspect of the present invention, the chain tensioning device according to the first aspect is configured so that the at least one primary flow limiting valve includes a first primary flow limiting valve attached to the first member to form a first primary flow path between the first primary flow limiting valve and the second member, and a second primary flow limiting valve attached to the second member to form a second primary flow path between the second primary flow limiting valve and the first member. The at least one support member includes a first support member attached to the first member and a second support member attached to the second member.

In accordance with an eighth aspect of the present invention, the chain tensioning device according to the first aspect is configured so that the at least one of the primary flow limiting valve is configured so that the primary flow path extends in an axial direction with respect to the rotational axis.

In accordance with a ninth aspect of the present invention, the chain tensioning device according to the first aspect is configured so that the rotary fluid damper unit further includes at least one secondary flow limiting valve having a secondary attachment portion and a secondary flexible valve portion. The secondary attachment portion is attached to at least one of the primary flow limiting valve and the one of the first and second members. The secondary flexible valve portion is configured to form a secondary flow path between a free end of the second flexible valve portion of the at least one secondary flow limiting valve.

In accordance with a tenth aspect of the present invention, the chain tensioning device according to the ninth aspect is configured so that the secondary flexible valve portion is angularly inclined with respect to the secondary attachment portion.

In accordance with an eleventh aspect of the present invention, the chain tensioning device according to the ninth aspect is configured so that the at least one of the primary flow limiting valve is configured so that the primary flow path extends in an axial direction with respect to the rotational axis, and the at least one of the secondary flow limiting valve is configured so that the secondary flow path extends in a radial direction with respect to the rotational axis.

In accordance with a twelfth aspect of the present invention, the chain tensioning device according to the ninth aspect is configured so that the secondary flexible valve portion is disposed between the at least one primary flow limiting valve and an axial end wall of the other of the first and second members in an axial direction with respect to the rotational axis.

In accordance with a thirteenth aspect of the present invention, the chain tensioning device according to the first aspect is configured so that the at least one primary flow limiting valve includes a first primary flow limiting valve attached to the first member to form a first primary flow path between the first primary flow limiting valve and the second member, and a second primary flow limiting valve attached to the second member to form a second primary flow path between the second primary flow limiting valve and the first member. The at least one support member includes a first support member attached the first member and a second support member attached the second member.

In accordance with a fourteenth aspect of the present invention, the chain tensioning device according to the thirteenth aspect is configured so that the at least one second flow limiting valve includes a first secondary flow limiting valve attached the first member to form a first secondary flow path between the first secondary flow limiting valve and the second member, and a second secondary flow limiting valve attached to the second member to form a second secondary flow path between the second secondary flow limiting valve and the first member.

In accordance with a fifteenth aspect of the present invention, the chain tensioning device according to the first aspect further comprises a biasing element biasing the chain guide in a first rotational direction around the rotational axis with respect to the main body. The rotary fluid damper unit provides a higher degree of rotational resistance in a second rotational direction, which is opposite to the first rotational direction.

In accordance with a sixteenth aspect of the present invention, the chain tensioning device according to the first aspect is configured so that the chain guide includes at least one pulley.

In accordance with a seventeenth aspect of the present invention, the chain tensioning device according to the first aspect is configured so that the main body includes a base member, a movable member and a linkage structure operatively coupled between the base member and the movable member to move the movable member and the chain guide relative to the base member. The rotary fluid damper unit being disposed on the movable member.

Also other objects, features, aspects and advantages of the disclosed chain tensioning device will become apparent to those skilled in the art from the following detailed description, which, taken in conjunction with the annexed drawings, discloses one embodiment of the chain tensioning device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
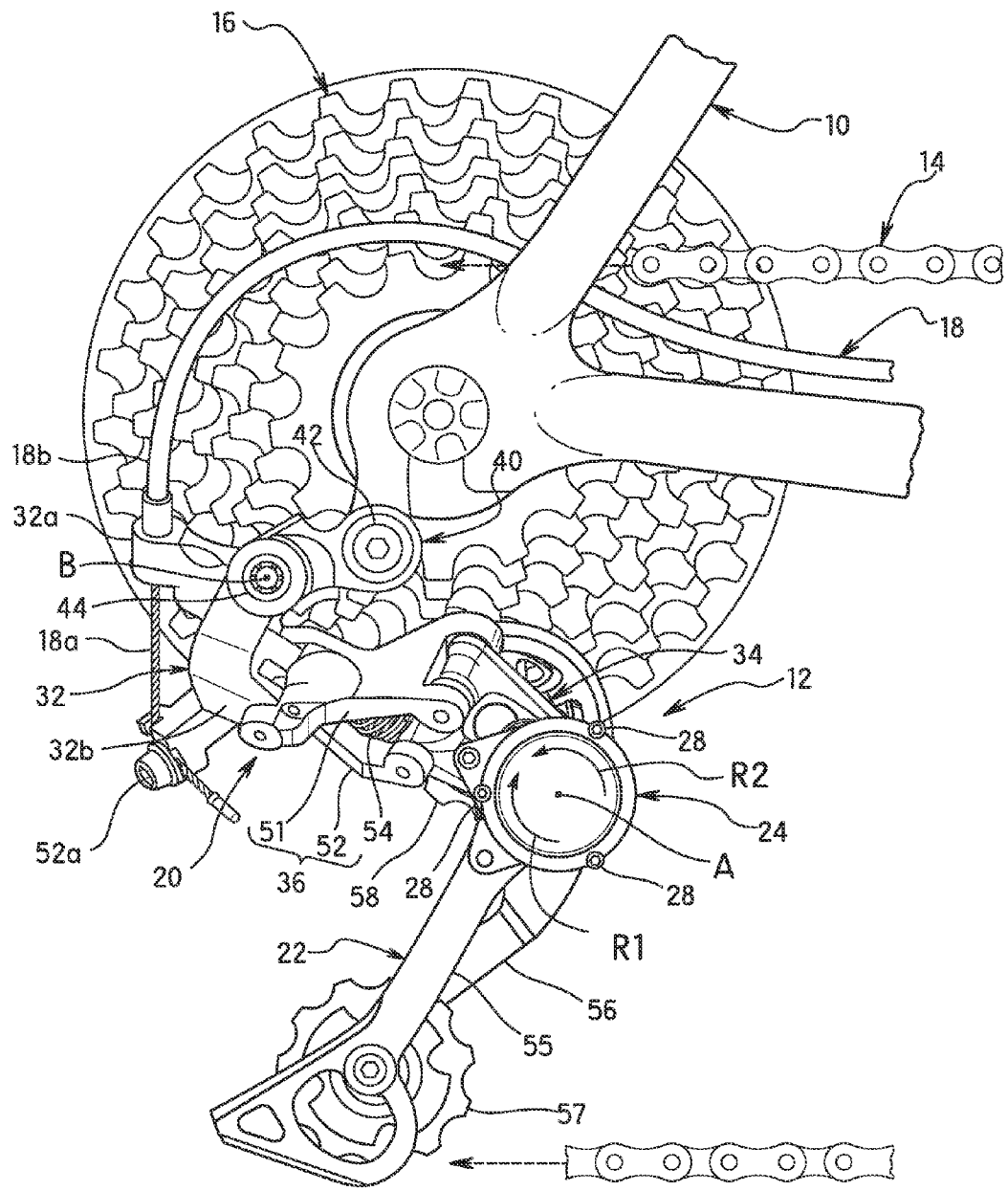
FIG. 1 is a partial side elevational view of a rear frame portion of a bicycle with a bicycle rear derailleur (i.e., a chain tensioning device) in accordance with one illustrated embodiment.

Referring initially to FIG. 1, a portion of a bicycle 10 is illustrated that includes a bicycle rear derailleur 12 (i.e., a chain tensioning device) in accordance with a first embodiment. The bicycle rear derailleur 12 is configured to shift a chain 14 between adjacent ones of a plurality of rear sprockets 16 in a conventional manner. In the first embodiment, the bicycle rear derailleur 12 is operated by a control cable 18 in a conventional manner. Here, the control cable 18 is a Bowden cable that has an inner wire 18a slidably disposed inside an outer casing 18b. However, the bicycle rear derailleur 12 is not limited to a cable operated derailleur. In other words, it will be apparent to those skilled in the bicycle field from this disclosure that the bicycle rear derailleur 12 can include an actuator such a motor, a pneumatic actuator, a hydraulic actuator or the like for shifting the chain 14 between the rear sprockets 16.

The bicycle rear derailleur 12 (i.e., a chain tensioning device) basically comprises a main body 20, a chain guide 22 and a rotary fluid damper unit 24. The main body 20 is configured to be mounted to the bicycle 10 in a detachable and reinstallable manner. The chain guide 22 is pivotally coupled to the main body 20 to rotate around a rotational axis A with respect to the main body 20. The rotary fluid damper unit 24 is operatively connected between the main body 20 and the chain guide 22 to provide rotational resistance to the chain guide 22 around the rotational axis A. While the rotary fluid damper unit 24 is used in a rear derailleur, it will be apparent to those skilled in the bicycle field from this disclosure that the rotary fluid damper unit 24 can be used as merely a chain tensioning device (also called a chain tensioner) that is used with an internally geared hub or by itself. The rotary fluid damper unit 24 slows sudden movement of the chain guide 22 in at least one direction. The rotary fluid damper unit 24 is a one-way rotary damper that provides different rotational resistance in different rotational directions.

Figure 2:
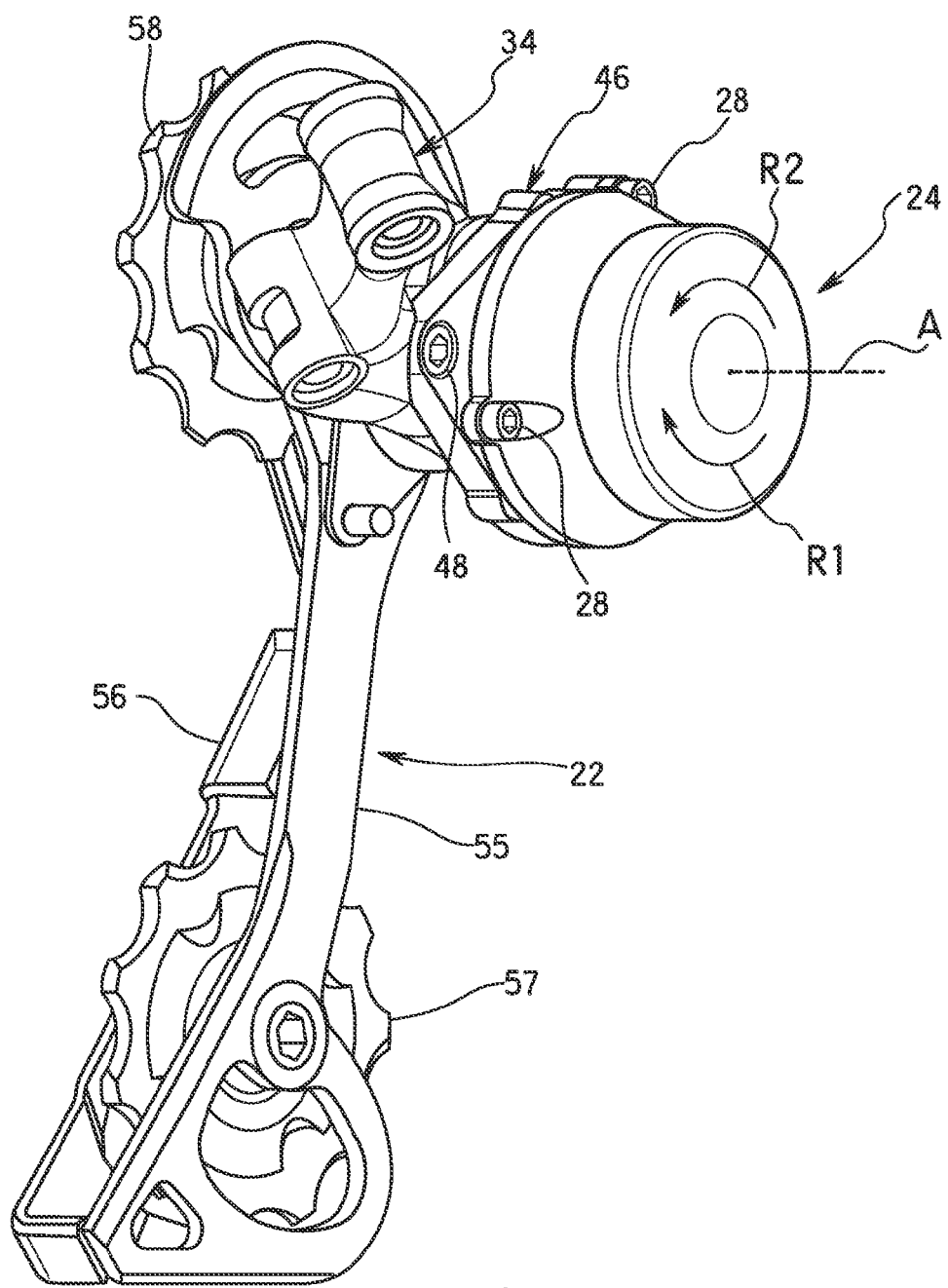
FIG. 2 is a perspective view of the movable member, the chain guide and the rotary fluid damper unit of the rear derailleur illustrated in FIG. 1 as viewed from the non-frame facing side of the rear derailleur.

As seen in FIGS. 1 and 2, the rotary fluid damper unit 24 is a separate unit from the main body 20. Thus, the phrase "separate unit" as used herein means that the rotary fluid damper unit 24 is a self-contained and completely independent structure that can operate without any structure of the main body 20 (e.g., the housing of the rotary fluid damper unit 24 is not formed by a part of the main body 20. The rotary fluid damper unit 24 is detachably mounted on the main body 20 such that the rotary fluid damper unit 24 can be detached from the main body 20 and reinstalled on the main body 20 on the main body 20 without having to disassemble the main body 20 as explained later. Thus, the phrases "detachably mounted", "detachably attached" and the like as used herein means that the rotary fluid damper unit 24 is configured to be detached from the main body 20 and reinstalled on the main body 20 on the main body 20 without having to disassemble the main body 20. The rotary fluid damper unit 24 is detachably attached to the main body 20 while the bicycle derailleur 12 is mounted to the bicycle 10. The rotary fluid damper unit 24 is detachably attached to the main body 20 on a non-frame facing side of the main body 20 by at least one fastener. Here, the rotary fluid damper unit 24 is detachably attached to the main body 20 by a plurality (three) of fasteners 28. The fasteners 28 are preferably threaded fasteners such as bolts.

In the first embodiment, as seen in FIG. 1, the main body 20 includes a base member 32, a movable member 34 and a linkage structure 36. The linkage structure 36 is operatively coupled between the base member 32 and the movable member 34 to move the movable member 34 and the chain guide 22 relative to the base member 32. The base member 32 defines a first end of the main body 20. The movable member 34 defines a second end of the main body 20.

Figure 3:
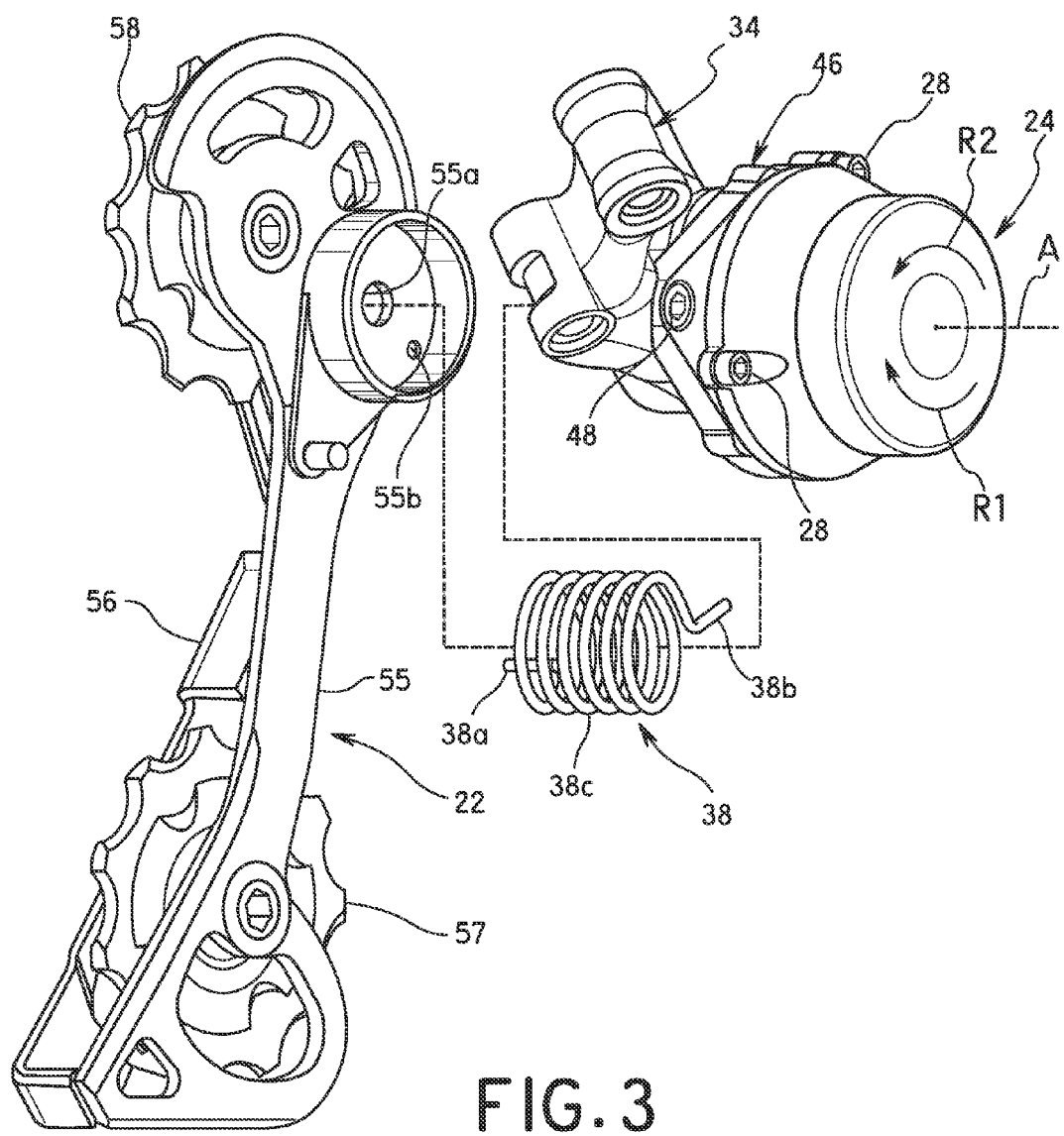
FIG. 3 is a partially exploded perspective view of the movable member, the chain guide and the rotary fluid damper unit of the rear derailleur illustrated in FIGS. 1 and 2 as viewed from the non-frame facing side of the rear derailleur.
Figure 4:
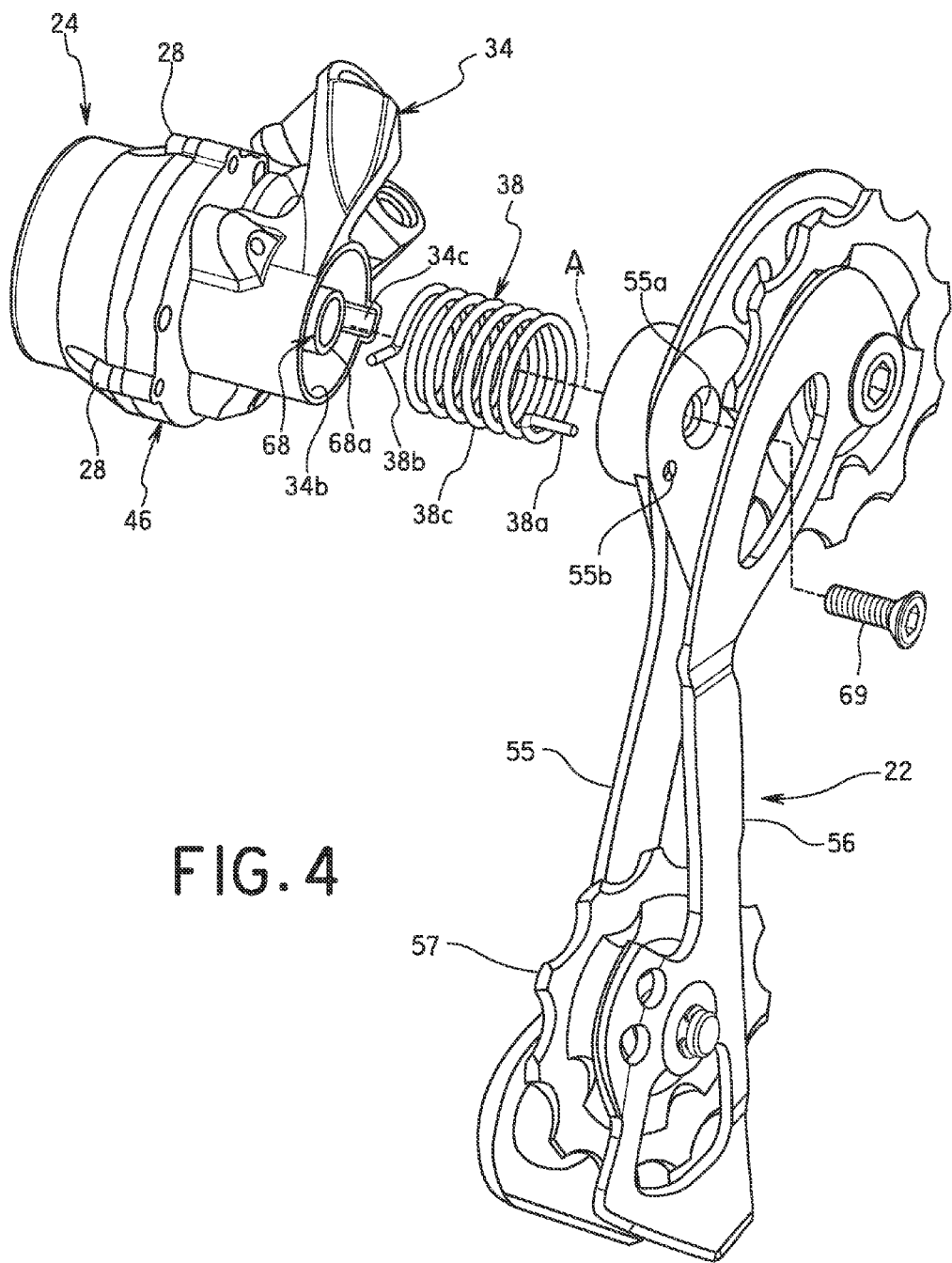
FIG. 4 is a partially exploded perspective view of the chain guide, the movable member, the mounting member and the rotary fluid damper unit illustrated in FIGS. 1 to 3 as viewed from the frame facing side of the rear derailleur.
Figure 6:
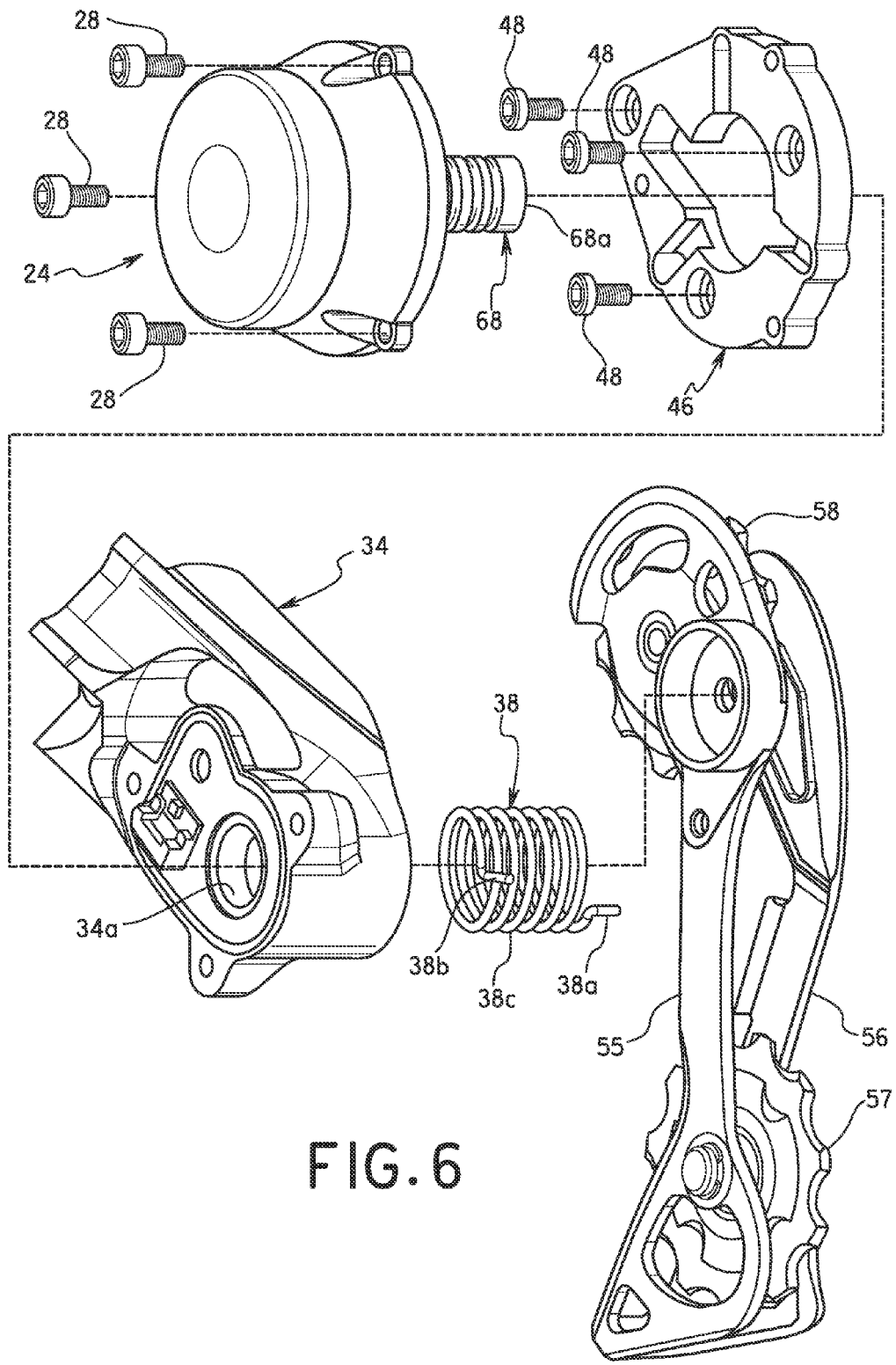
FIG. 6 is a partially exploded perspective view of the rotary fluid damper unit illustrated in FIGS. 1 to 5 as viewed from the non-frame facing side.
Figure 7:
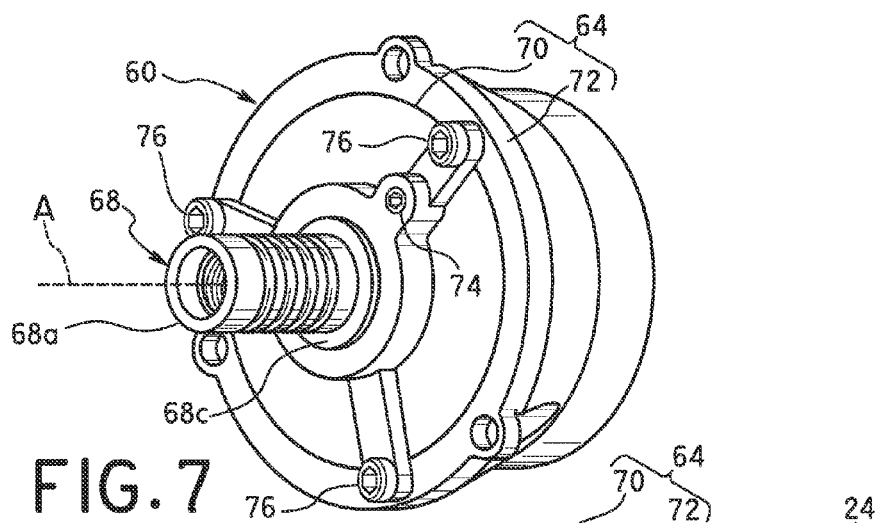
FIG. 7 is a perspective view of the rotary fluid damper unit illustrated in FIGS. 1 to 6 as viewed from the frame facing side with the rotational shaft of the chain guide coupled thereto.

As seen in FIGS. 3, 4 and 6, the bicycle rear derailleur 12 (i.e., a chain tensioning device) further comprises a biasing element 38 that biases the chain guide 22 in a first rotational direction R1 around the rotational axis A with respect to the movable member 34 of the main body 20. In the illustrated embodiment, the biasing element 38 is a torsion spring having a first end portion 38a, a second end portion 38b and a coiled portion 38c. The first end portion 38a is engaged with the chain guide 22, while the second end portion 38b is engaged with the movable member 34. The coiled portion 38c is preloaded to bias the chain guide 22 in the first rotational direction R1 around the rotational axis A with respect to the movable member 34 to apply tension to the chain 14. As explained later, the rotary fluid damper unit 24 provides a higher degree of rotational resistance in a second rotational direction R2, which is opposite to the first rotational direction R1.

As seen in FIG. 1, the base member 32 is releasably mounted to the bicycle 10 via a bracket axle unit 40 and a fixing bolt 42. The base member 32 is a rigid member made of a suitable material such as a metallic material or a fiber reinforced plastic material. The base member 32 is pivotally supported on the bracket axle unit 40 by a B-axle 44 that defines a rotational axis B. The rotational axis B is parallel to the rotational axis A. The base member 32 has an outer casing support portion 32a that supports one end of the outer casing 18b of the control cable 18. The base member 32 has a main portion 32b in which the linkage structure 36 is pivotally attached as explained below.

As seen in FIGS. 2 to 4, the movable member 34 pivotally supports the chain guide 22 to the main body 20 so that the chain guide 22 can pivot about the rotational axis A. The movable member 34 supports the rotary fluid damper unit 24, which is operatively coupled to the chain guide 22 for providing different rotational resistance in different rotational directions about the rotational axis A. The movable member 34 is a rigid member made of a suitable material such as a metallic material or a fiber reinforced plastic material. Here, an adapter plate 46 is used for fixedly securing the rotary fluid damper unit 24 to the movable member 34. The adapter plate 46 is attached to the movable member 34 by a plurality (three) of fasteners 48. The fasteners 48 are preferably threaded fasteners such as bolts. The rotary fluid damper unit 24 is non-movably attached to the movable member 34 by the fasteners 28. In this way, the rotary fluid damper unit 24 is disposed on the movable member 34.

Figure 5:
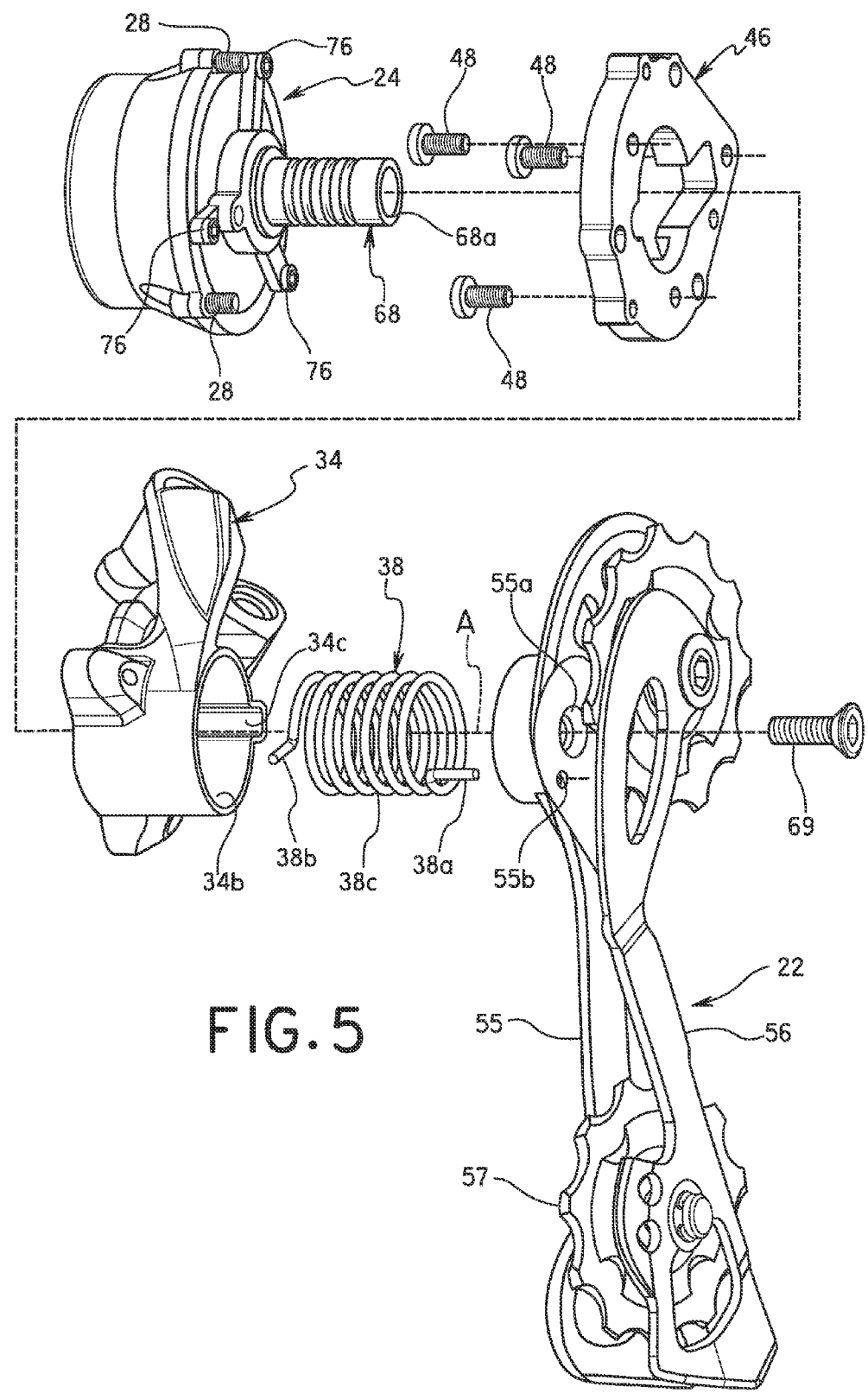
FIG. 5 is a further partially exploded perspective view of the chain guide, the movable member, the mounting member and the rotary fluid damper unit illustrated in FIGS. 1 to 4 as viewed from the frame facing side of the rotary fluid damper unit.

As seen in FIG. 6, the movable member 34 has an axle opening 34a for operatively coupling the chain guide 22 to the rotary fluid damper unit 24. As seen in FIG. 5, the movable member 34 also has a recess 34b that is sized for receiving the coiled portion 38c of the biasing element 38. The recess 34b has a key portion 34c for receiving the second end portion 38b of the biasing element 38.

In the first embodiment, as seen in FIG. 1, the linkage structure 36 includes a first or outer link 51 and a second or inner link 52. The outer link 51 has a first end pivotally connected to the main portion 32b of the base member 32, and a second end pivotally connected to the movable member 34. The inner link 52 has a first end pivotally connected to the main portion 32b of the base member 32, and a second end pivotally connected to the movable member 34. Thus, the outer and inner links 51 and 52 have first ends pivotally connected to the base member 32 and second ends pivotally connected to the movable member 34 to define a four bar linkage arrangement. Here, as seen in FIG. 1, the inner link 52 has a cable attachment member or bolt 52a for attaching the inner wire 18a of the cable 18 to the inner link 52.

The linkage structure 36 further includes a biasing member 54 that is interposed between the outer and inner links 51 and 52 to bias the movable member 34 towards one of a low shift stage position and a top shift stage position. In the first embodiment, the biasing member 54 is a coil tension spring that biases the movable member 34 towards the top shift stage position. As used herein, the term "top shift stage (gear) position" refers to the rear derailleur 12 being in an operating position that corresponds to the chain 14 being guided onto the one of the rear sprockets 16 with the smallest number of teeth. As used herein, the term "low shift stage (gear) position" refers to the rear derailleur 12 being in an operating that corresponds to the chain 14 being guided onto the one of the rear sprockets 16 with the largest number of teeth.

As seen in FIGS. 1 to 6, the chain guide 22 basically includes a first or outer chain cage plate 55, a second or inner chain cage plate 56, a first or tension pulley 57 and a second or guide pulley 58. The chain guide 22 includes at least one pulley (i.e., the first or tension pulley 57) so that the rear derailleur 12 functions as a chain tensioning device. The chain cage plates 55 and 56 define a chain receiving slot for receiving the chain 14. The pulleys 57 and 58 are both rotatably disposed between the chain cage plates 55 and 56. Here, the guide pulley 58 has its rotational axis offset from the rotational axis A of the chain guide 22. However, it will be apparent that from this disclosure that the rotational axis of the guide pulley 58 can be coincident with the rotational axis A of the chain guide 22. As seen in FIGS. 3 and 4, the chain cage plate 55 of the chain guide 22 also has an opening 55a for attaching the rotary fluid damper unit 24 to the chain guide 22. The chain cage plate 55 of the chain guide 22 also has an opening 55b for receiving the first end 38a of the biasing element 38, which biases chain guide 22 in the first rotational direction R1.

Now, the rotary fluid damper unit 24 will be discussed in more detail with reference mainly to FIGS. 7 to 22. As seen in FIGS. 9 and 10, the rotary fluid damper unit 24 includes a housing 60. The housing 60 includes a first (inner) member 62 and a second (outer) member 64. As seen in FIG. 10, the first (inner) member 62 is disposed inside of the second (outer) member 64 to define a fluid cavity 66 that is filled with a fluid. The first (inner) member 62 includes a rotational shaft 68 (i.e., a mounting portion) that extends outside of the second (outer) member 64 in an axis direction of the rotational axis A. As explained later, the chain guide 22 is mounted to the rotational shaft 68 (i.e., the mounting portion) of the first (inner) member 62.

The rotational shaft 68 has a first end portion 68a that is fixed to the chain cage plate 55 by a fastener 69 as seen in FIGS. 4 and 5. The fastener 69 is preferably a threaded fastener such as a screw. The rotational shaft 68 has a longitudinal center axis that defines the rotational axis A of the chain guide 22. As explained below, the rotational shaft 68 has a second end portion 68b that extends into the rotary fluid damper unit 24 (See, FIGS. 7 and 8). The rotational shaft 68 has an annular flange 68c that is axially retained between the rotary fluid damper unit 24 and the movable member 34 with respect to the rotational axis A. In this way, the rotational shaft 68 can rotate relative to the movable member 34, but does not move axially except for a small amount of play.

In the illustrated embodiment, as seen in FIGS. 11, and 13 to 16, the first (inner) member 62 includes a base portion 62a, a tubular portion 62b and a valve mounting portion 62c. The base portion 62a, the tubular portion 62b and the valve mounting portion 62c are integrally formed as a one-piece member from of a suitable material such as a lightweight metallic material or a reinforced plastic material. The base portion 62a is a circularly shaped disc that has a center opening. The tubular portion 62b extends from the center opening of the base portion 62a. The base portion 62a has an axial facing surface that forms an axial end wall 66a of the fluid cavity 66. The axial end wall 66a is a stepped wall having a first wall section 66a1 and a second wall section 66a2. The first wall section 66a1 extends from the tubular portion 62b. The second wall section 66a2 encircles the first wall section 66a1. The first wall section 66a1 defines a recess between the tubular portion 62b and the second wall section 66a2. The valve mounting portion 62c extends between the axial end wall 66a of the base portion 62a and the outer surface of the tubular portion 62b. The valve mounting portion 62c is tangentially arranged with respect to the tubular portion 62b. The tubular portion 62b has a splined inner surface 62b1, which mates with a splined outer surface 68b1 of the second end portion 68b of the rotational shaft 68. In this way, the first (inner) member 62 is non-rotatably attached to the rotational shaft 68.

Figure 8:
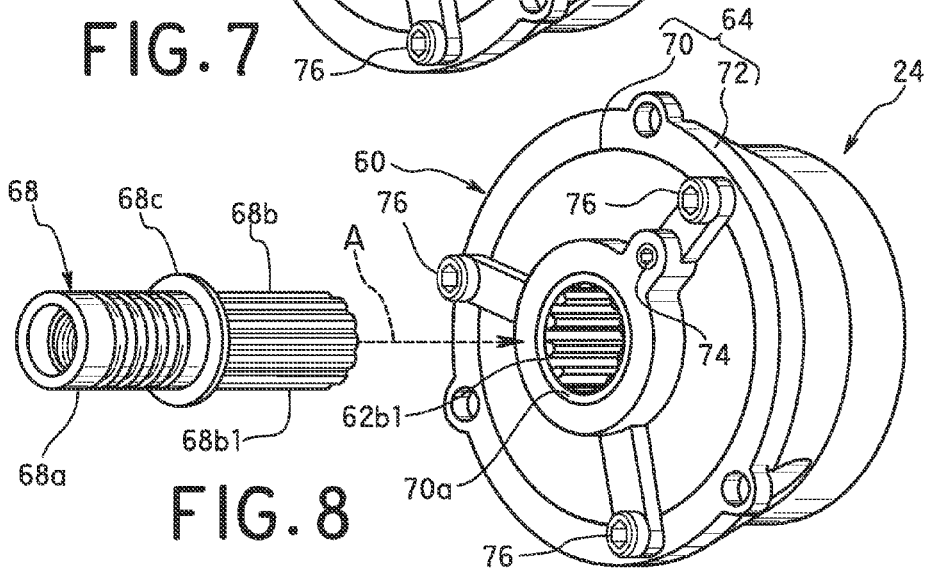
FIG. 8 is a perspective view of the rotary fluid damper unit illustrated in FIG. 7 with the rotational shaft of the chain guide exploded away from the rotary fluid damper unit.
Figure 9:
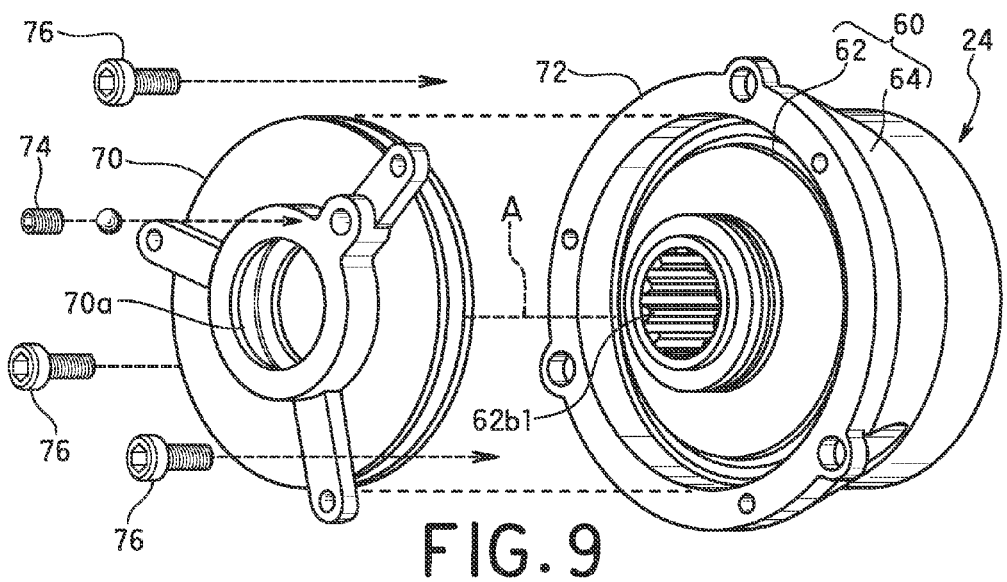
FIG. 9 is a partially exploded perspective view of the rotary fluid damper unit illustrated in FIGS. 7 and 8 with the first and second outer covers of the outer (second) member of the housing being separated.
Figure 10:
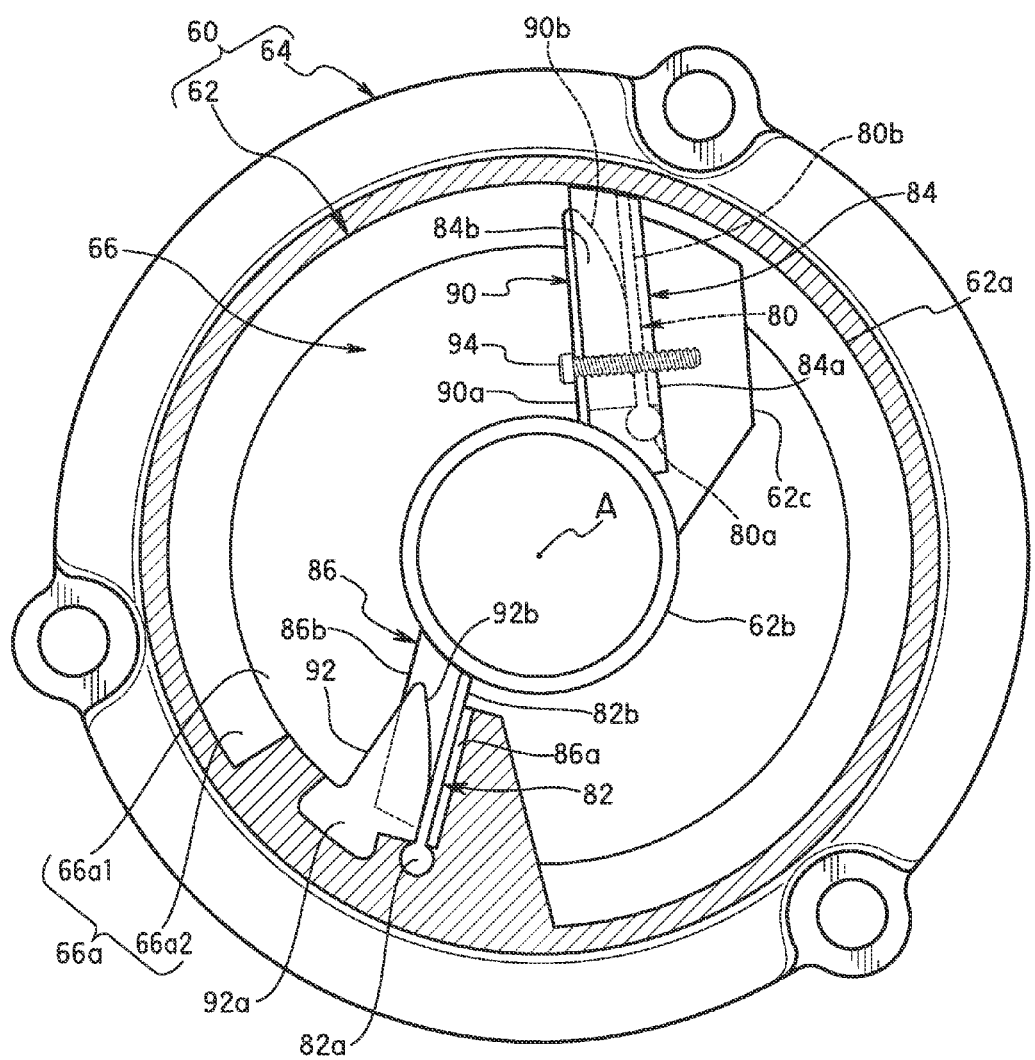
FIG. 10 is a transverse cross sectional view of the rotary fluid damper unit illustrated in FIGS. 7 to 9 as viewed along a section line that perpendicular to the rotational axis of the chain guide in which the second outer cover of the outer (second) member of the housing is shown in cross section.
Figure 11:
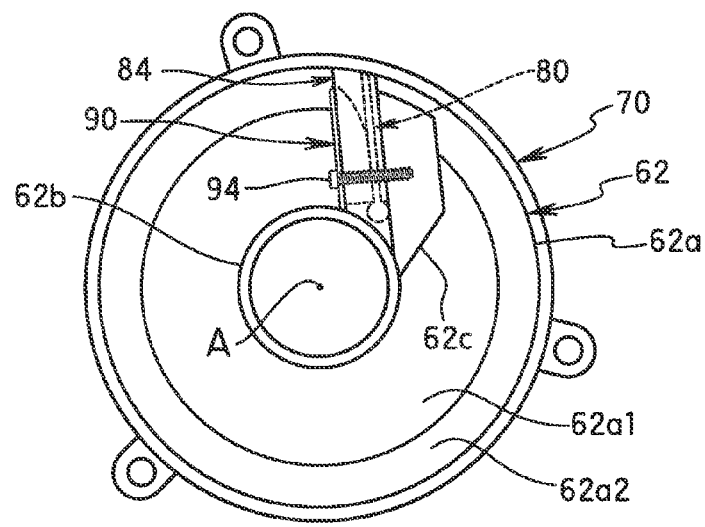
FIG. 11 is an elevational view of the inner (first) member of the housing rotatably disposed on the first outer cover of the housing and the first primary flow limiting valve and the first secondary flow limiting valve attached to the inner (first) member of the housing.
Figure 12:
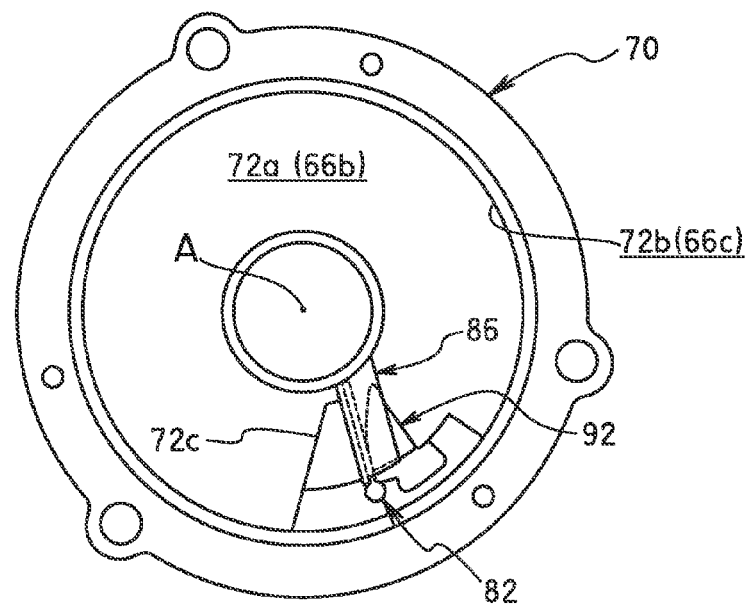
FIG. 12 is an elevational view of the second outer cover of the outer (second) member of the housing with the second primary flow limiting valve and the second secondary flow limiting valve attached to the second outer cover of the outer (second) member of the housing.
Figure 13:
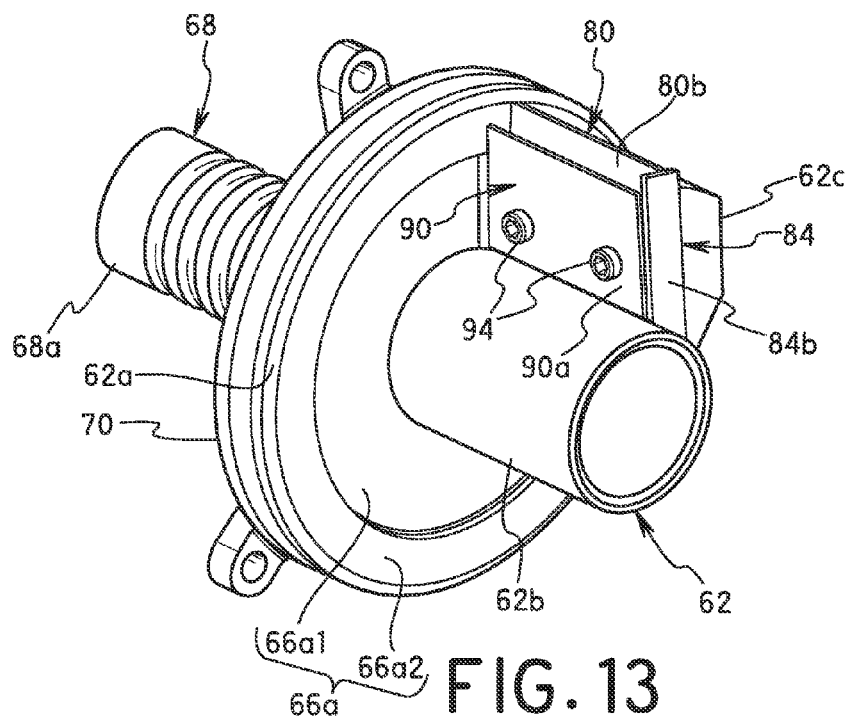
FIG. 13 is a perspective view of selected parts of the rotary fluid damper unit illustrated in FIGS. 7 to 9 as viewed from the non-frame facing side of the rotary fluid damper unit to illustrate the first primary flow limiting valve and the first secondary flow limiting valve.
Figure 14:
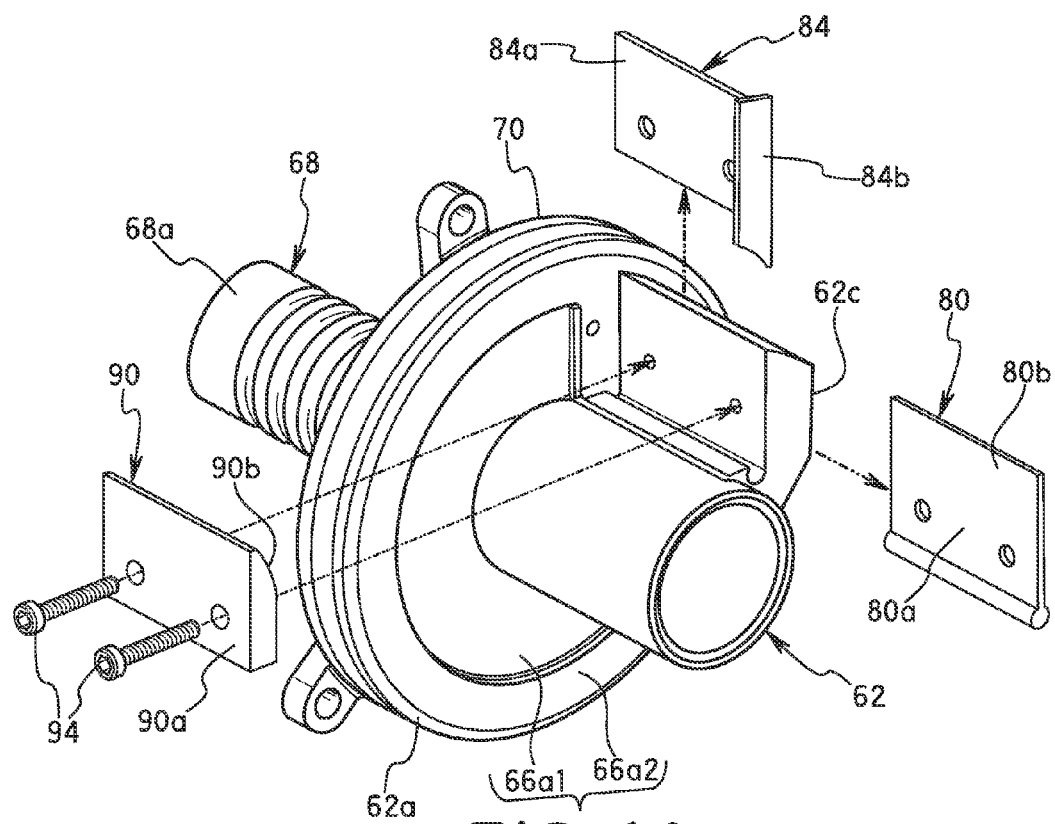
FIG. 14 is a partially exploded perspective view of the selected parts of the rotary fluid damper unit illustrated in FIG. 13 with the first primary flow limiting valve and the first secondary flow limiting valve exploded from the inner (first) member of the housing.
Figure 15:
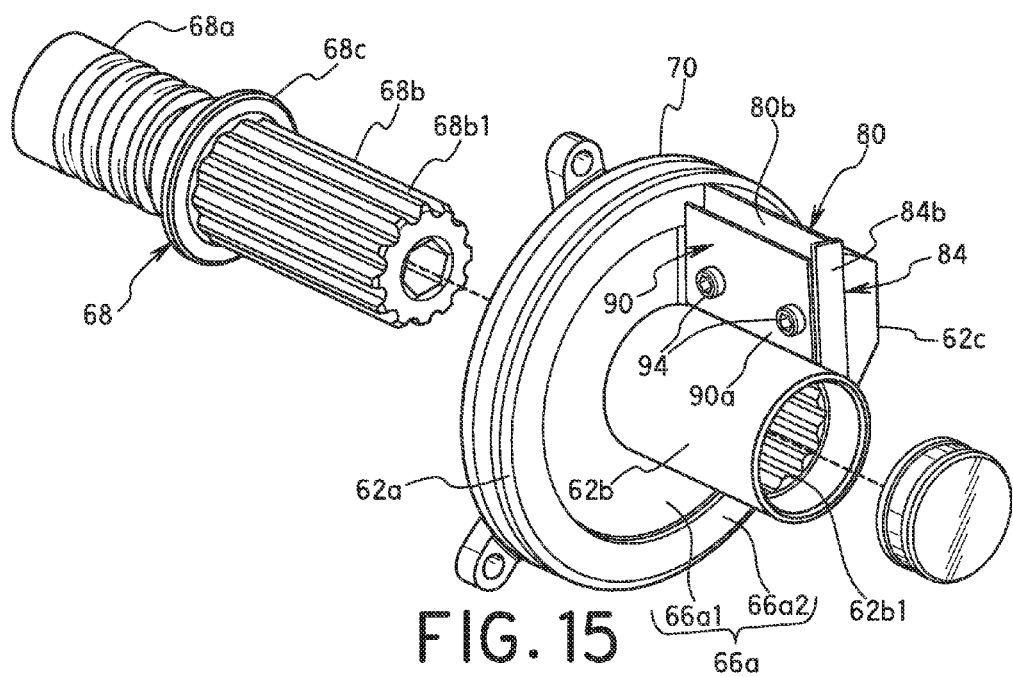
FIG. 15 is another partially exploded perspective view of the selected parts of the rotary fluid damper unit illustrated in FIG. 13.

In the illustrated embodiment, as seen in FIGS. 8 and 9, the second (outer) member 64 includes a first outer cover 70 and a second outer cover 72. Thus, the first outer cover 70 and the second outer cover 72 are configured to enclose the first (inner) member 62. The first outer cover 70 is integrally formed as a one-piece member made of a suitable material such as a lightweight metallic material or a reinforced plastic material. Likewise, the second outer cover 72 is integrally formed as a one-piece member made of a suitable material such as a lightweight metallic material or a reinforced plastic material. In the illustrated embodiment, the second outer cover 72 is attached to the movable member 34 by the fasteners 28. Accordingly, in the illustrated embodiment, the second (outer) member 64 is fixed to the main body 20. As explained later, the first (inner) member 62 supports a first flow limiting structure, which cooperates with the second outer cover 72 of the second (outer) member 64 to form a one-way rotary damper that provides different rotational resistance in different rotational directions.

As seen in FIGS. 6 to 8 and 15, the first outer cover 70 has an axle opening 70a in which the rotational shaft 68 extends through. The rotational shaft 68 is non-rotatably coupled to the first (inner) member 62 of the rotary fluid damper unit 24 such that the rotational shaft 68 and the first (inner) member 62 rotate together. In this way, the first (inner) member 62 is rotatably disposed inside of the second (outer) member 64. Since the rotational shaft 68 is fixed to the chain guide 22, the first (inner) member 62 and the chain guide 22 also rotate together. Accordingly, in the illustrated embodiment, the first (inner) member 62 is fixed to the chain guide 22. However, the rotary fluid damper unit 24 could be constructed with the first (inner) member 62 is fixed to the main body 20 and the second (outer) member 64 is fixed to the chain guide 22. Thus, the first (inner) member 62 is fixed to one of the main body 20 and the chain guide 22, while the second (outer) member 64 is fixed to the other of the main body 20 and the chain guide 22.

Figure 16:
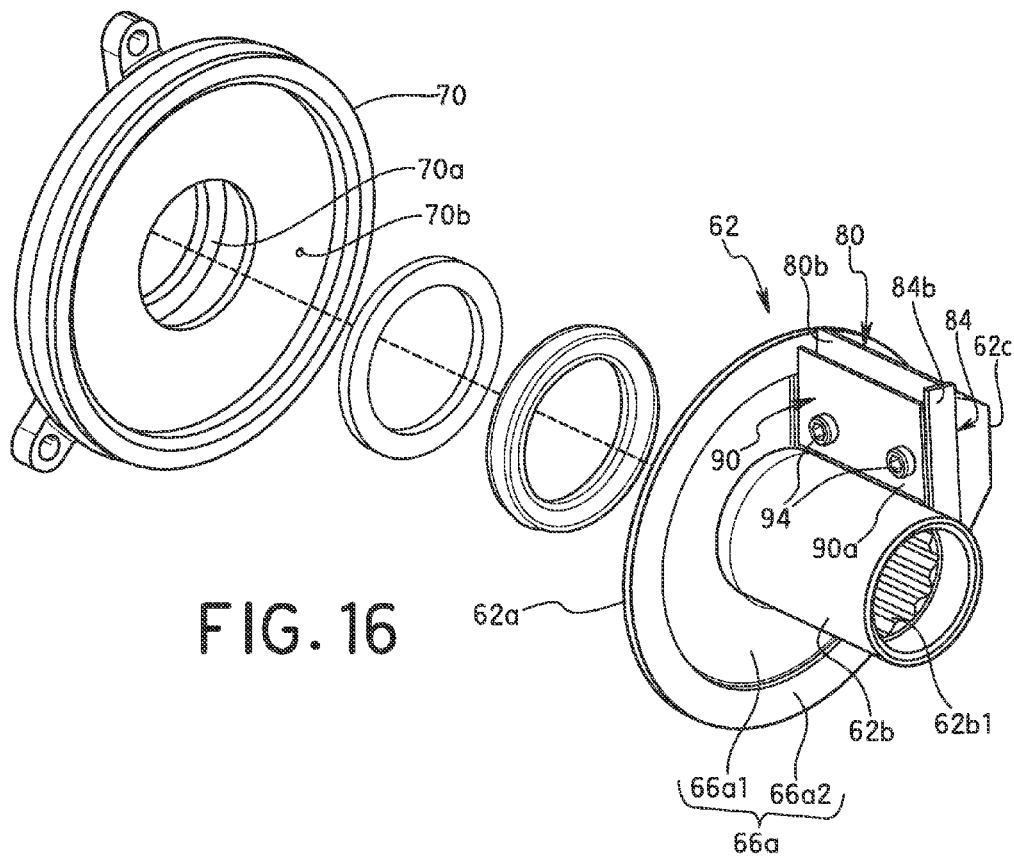
FIG. 16 is another partially exploded perspective view of the selected parts of the rotary fluid damper unit illustrated in FIG. 13.

As seen in FIGS. 8 and 16, the first outer cover 70 also has a fluid opening 70b (i.e., a bleed valve port) that communicates with the interior defined by the first outer cover 70 and the second outer cover 72. A plug 74 (i.e., a bleed valve) is screwed into the fluid opening 70b to close off or open the fluid opening 70b for adding fluid and/or bleeding air from the fluid cavity 66.

Figure 17:
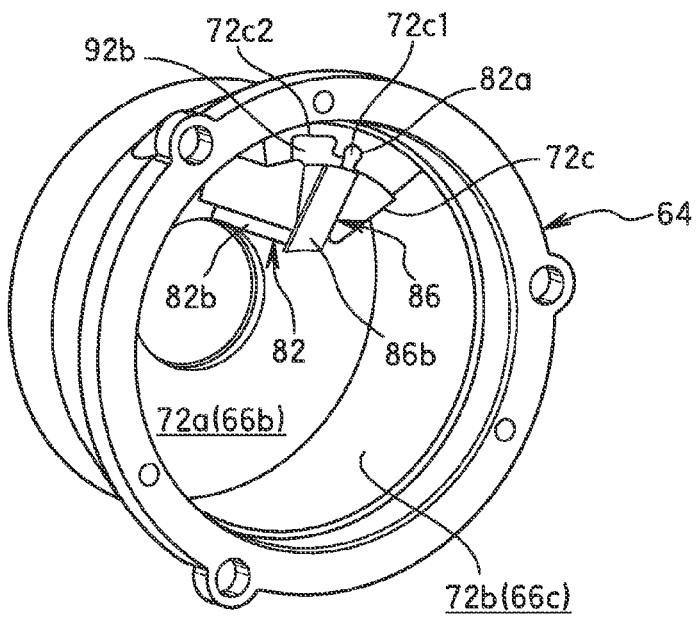
FIG. 17 is a perspective view of the second outer cover of the outer (second) member of the housing with the second primary flow limiting valve and the second secondary flow limiting valve attached to the second outer cover of the outer (second) member of the housing.
Figure 18:
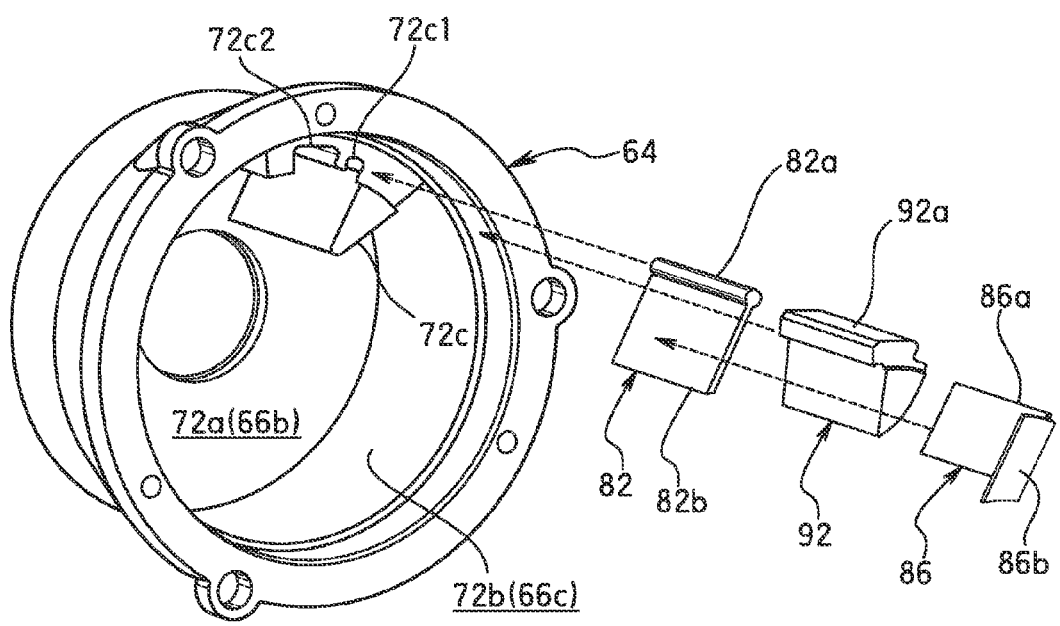
FIG. 18 is an exploded perspective view of the second outer cover of the outer (second) member of the housing with the second primary flow limiting valve and the second secondary flow limiting valve exploded from the second outer cover of the outer (second) member of the housing.

As seen in FIGS. 8, 16 and 17, the second outer cover 72 is a cup-shaped member that is fastened to the first outer cover 70. In particular, the first outer cover 70 is attached to the second outer cover 72 by a plurality (three) of fasteners 76. The fasteners 76 are preferably threaded fasteners such as bolts. As seen in FIG. 10, the first (inner) member 62 and the second (outer) member 64 define the fluid cavity 66 that is filled with a fluid. The second outer cover 72 has an axial end wall 72a, a cylindrical side wall 72b and a valve mounting portion 72c. The axial end wall 72a defines an axial end wall 66b of the fluid cavity 66 as seen in FIG. 10. The cylindrical side wall 72b defines an outer wall 66c of the fluid cavity 66. The valve mounting portion 72c has a valve receiving recess 72c1 and a support receiving recess 72c2. As explained later, the valve mounting portion 72c of the second outer cover 72 supports a second flow limiting structure, which cooperates with the first (inner) member 62 to form a one-way rotary damper that provides different rotational resistance in different rotational directions.

As seen in FIGS. 10 to 18, generally, the rotary fluid damper unit 24 includes at least one primary flow limiting valve and at least one support member. However, in the illustrated embodiment as described below, the rotary fluid damper unit 24 could be constructed with more than one primary flow limiting valve and more than one support member, as needed and/or desired. For example, as in the illustrated embodiment, the at least one primary flow limiting valve includes a first primary flow limiting valve that is attached to the first (inner) member 62 to form a first primary flow path between the first primary flow limiting valve and the second (outer) member 64, and a second primary flow limiting valve that is attached to the second (outer) member 64 to form a second primary flow path between the second primary flow limiting valve and the first (inner) member 62. In this arrangement of two primary flow limiting valve, the at least one support member includes a first support member that is attached the first (inner) member 62 and a second support member that is attached the second (outer) member 64. Speaking generally, the at least one primary flow limiting valve has a primary attachment portion that is attached to one of the first and second members 62 and 64 and a primary flexible valve portion. The at least one support member is attached to the one of the first and second members 62 and 64. In other words, in the rotary fluid damper unit 24, a primary flow limiting valve and a support member that is associated with the primary flow limiting valve can be attached to either of the first and second members 62 and 64. In this general arrangement, the at least one support member is located on a circumferential side of the at least one primary flow limiting valve. The primary flexible valve portion of the at least one primary flow limiting valve is configured to flex and contact the at least one support member to form a primary flow path between a free end of the primary flexible valve portion of the at least one primary flow limiting valve and the other of the first and second members 62 and 64. In other words, in the rotary fluid damper unit 24, the support member limits the bending of the primary flexible valve portion in one direction to create the desired primary flow path to attain a desired damping of the chain guide 22 rotating in the first rotational direction R1.

As seen in FIGS. 10 to 26, preferably, the rotary fluid damper unit 24 further includes at least one secondary flow limiting valve having a secondary attachment portion and a secondary flexible valve portion. However, in the illustrated embodiment as described below, the rotary fluid damper unit 24 could be constructed with more than one second flow limiting valve, as needed and/or desired. For example, as in the illustrated embodiment, the at least one second flow limiting valve includes a first secondary flow limiting valve attached the first (inner) member 62 to form a first secondary flow path between the first secondary flow limiting valve and the second (outer) member 64, and a second secondary flow limiting valve attached to the second (outer) member 64 to form a second secondary flow path between the second secondary flow limiting valve and the first (inner) member 62.

Speaking generally, the secondary attachment portion is attached to at least one of the primary flow limiting valve and the one of the first and second members 62 and 64. In this general arrangement, the secondary flexible valve portion is configured to form a secondary flow path between a free end of the second flexible valve portion of the at least one secondary flow limiting valve. As will become apparent from the following description of the illustrated embodiment, by including a secondary flow limiting valve, the primary flow limiting valve does not need to be manufactured with a high degree of dimensional accuracy.

In the illustrated embodiment, the rotary fluid damper unit 24 includes a first primary flow limiting valve 80, a second primary flow limiting valve 82, a first secondary flow limiting valve 84 and a second secondary flow limiting valve 86. Also in the illustrated embodiment, the rotary fluid damper unit 24 includes a first support member 90 and a second support member 92. However, as mentioned above, the rotary fluid damper unit 24 could be constructed with only one flow limiting valve. In other words, in accordance with one aspect, the rotary fluid damper unit 24 includes at least one primary flow limiting valve (e.g., the first primary flow limiting valve 80 and/or the second primary flow limiting valve 82) and at least one support member (e.g., the first support member 90 and/or the second support member 92). In other words, in the illustrated embodiment, the at least one primary flow limiting valve includes the first primary flow limiting valve 80 and the second primary flow limiting valve 82.

Figure 21:
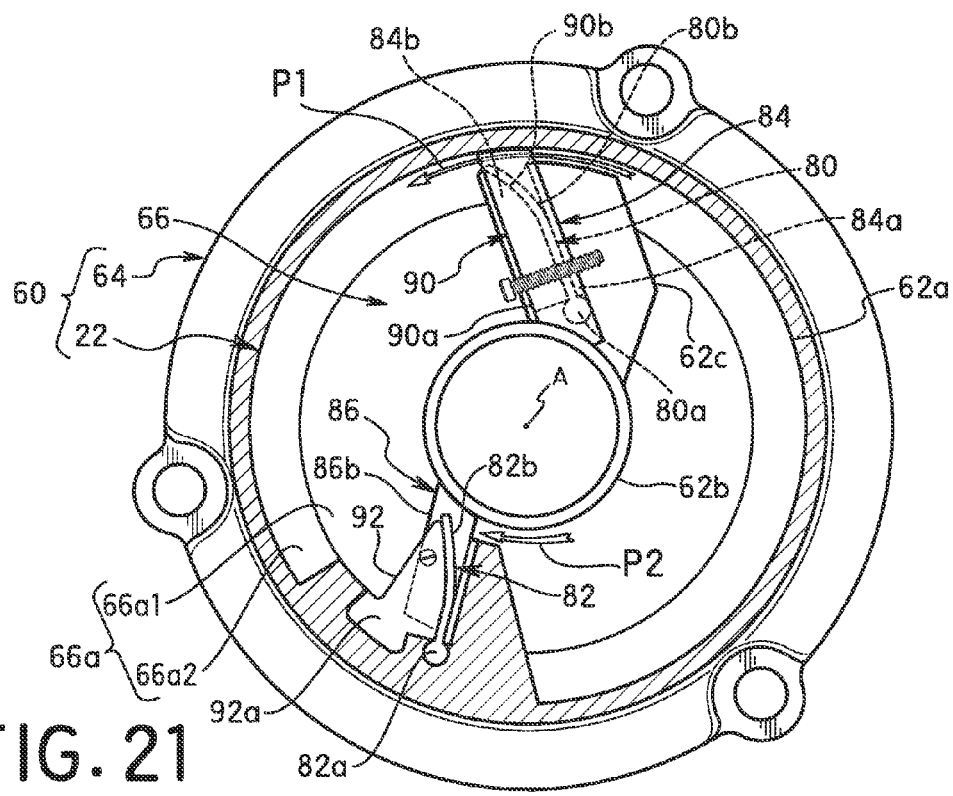
FIG. 21 is a transverse cross sectional view, similar to FIG. 19, of the rotary fluid damper unit illustrated in FIGS. 7 to 9, but with the inner (first) member of the rotary fluid damper unit rotating in a clockwise direction with respect to the outer (second) member of the rotary fluid damper unit from the position shown in FIG. 10.
Figure 22:
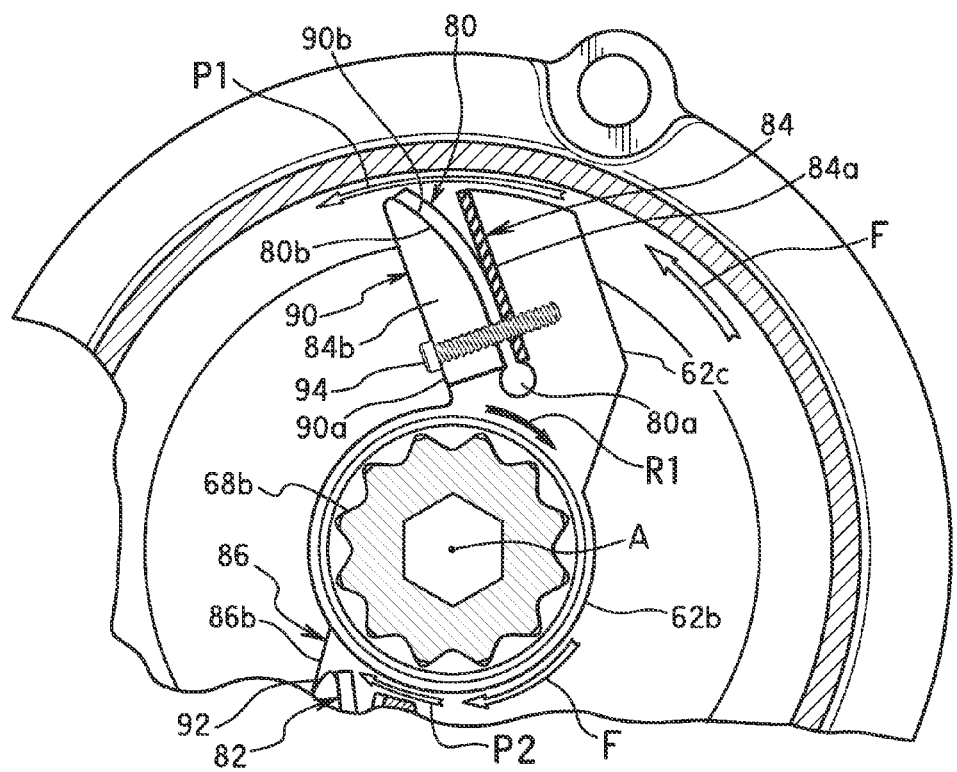
FIG. 22 is a partial enlarged view of selected parts of the rotary fluid damper unit illustrated in FIG. 21, showing the first primary flow limiting valve in the non-flow limiting position occurring during the clockwise rotating state of the inner (first) member.
Figure 23:
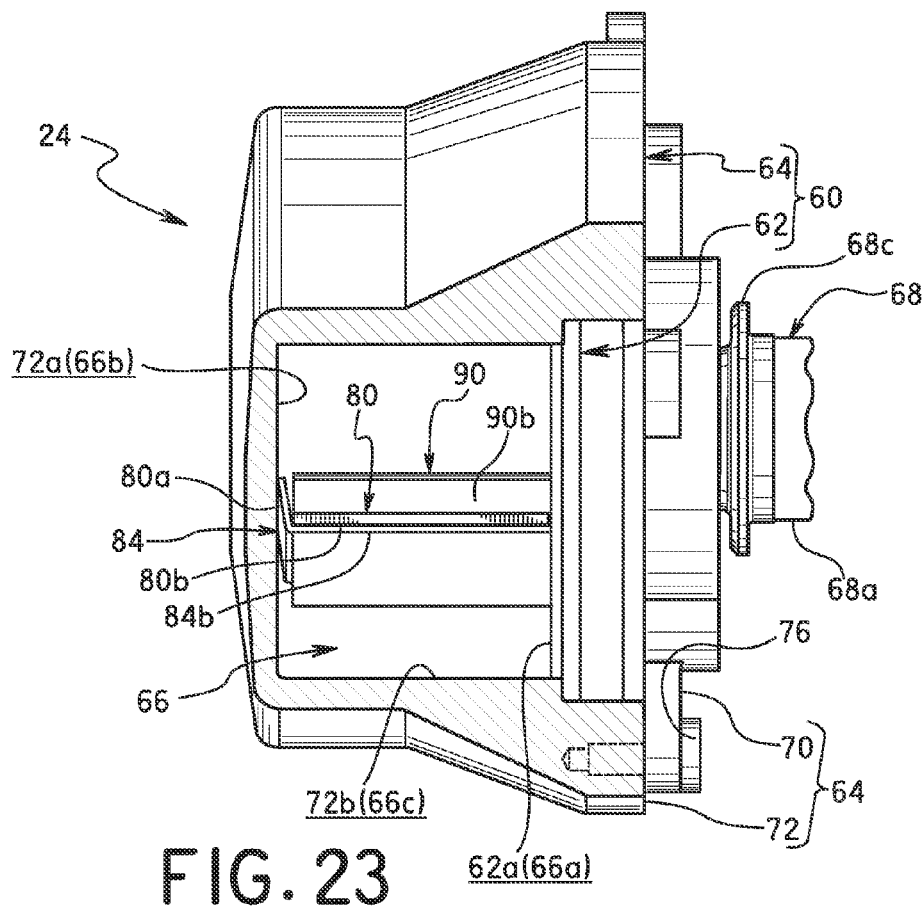
FIG. 23 is a side elevational view of the rotary fluid damper unit illustrated in FIGS. 7 to 9, but with the axial end wall of the outer (second) member of the rotary fluid damper unit broken away to show the first secondary flow limiting valve in the flow limiting position that occurs during both a resting state of the inner (first) member and a counter-clockwise rotating state of the inner (first) member.
Figure 24:
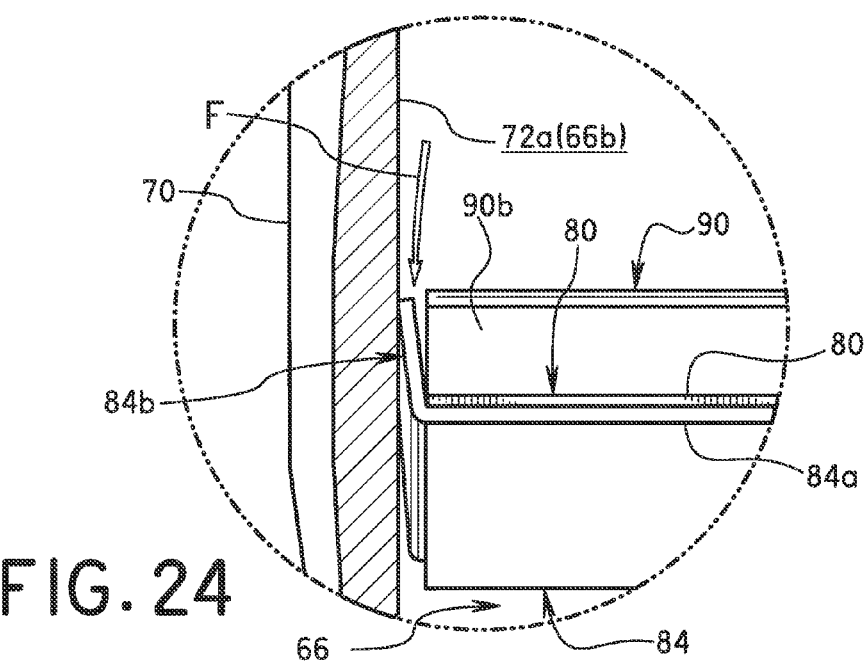
FIG. 24 is a partial enlarged view of selected parts of the rotary fluid damper unit illustrated in FIG. 23, showing the first secondary flow limiting valve in the flow limiting position that occurs during both a resting state of the inner (first) member and the clockwise rotating state of the inner (first) member.
Figure 25:
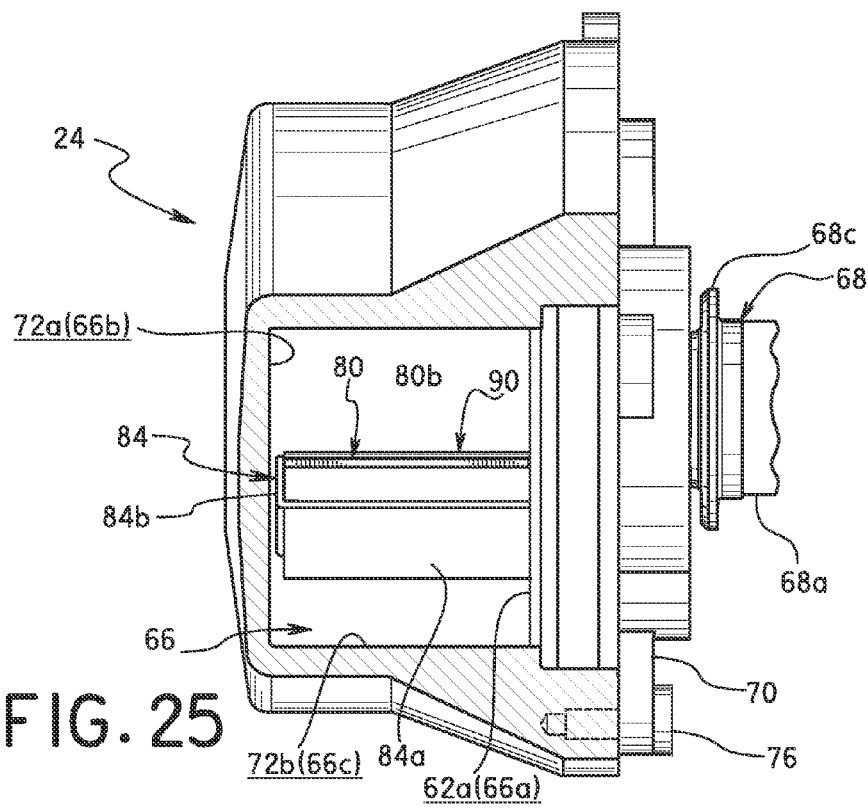
FIG. 25 is a side elevational view of the rotary fluid damper unit illustrated in FIGS. 7 to 9, but with the axial end wall of the outer (second) member of the rotary fluid damper unit broken away to show the first secondary flow limiting valve in the non-flow limiting position that occurs during a clockwise rotating state of the inner (first) member.

In the illustrated embodiment, as seen in FIG. 21, the first primary flow limiting valve 80 is attached to the first (inner) member 62 to form a first primary flow path P1 between the first primary flow limiting valve 80 and the second (outer) member 64. Also in the illustrated embodiment, as seen in FIG. 21, the second primary flow limiting valve 82 is attached to the second (outer) member 64 to form a second primary flow path P2 between the second primary flow limiting valve 82 and the first (inner) member 62. As seen in FIGS. 19 to 22, the first and second primary flow paths P1 and P2 are blocked or substantially blocked by the first and second primary flow limiting valves 80 and 82 being in a non-flexed state. Thus, when the first (inner) member 62 is rotated in the second rotational direction R2, the force F of the fluid in the cavity 66 pushing against the first and second primary flow limiting valves 80 and 82 to block or substantially block the first and second primary flow paths P1 and P2. On the other hand, when the first (inner) member 62 is rotated in the first rotational direction R1, the first and second primary flow limiting valves 80 and 82 are flexed by the fluid pressure F of the fluid to form the first and second primary flow paths P1 and P2.

Figure 26:
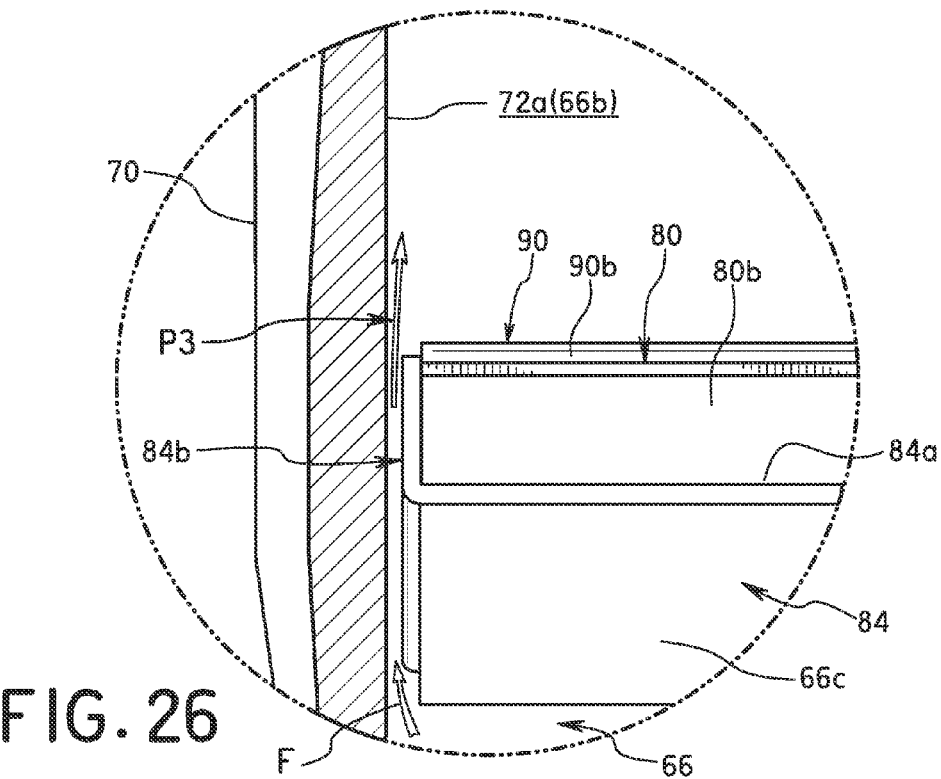
FIG. 26 is a partial enlarged view of selected parts of the rotary fluid damper unit illustrated in FIG. 25, showing the first secondary flow limiting valve in the non-flow limiting occurring during the clockwise rotating state of the inner (first) member.
Figure 27:
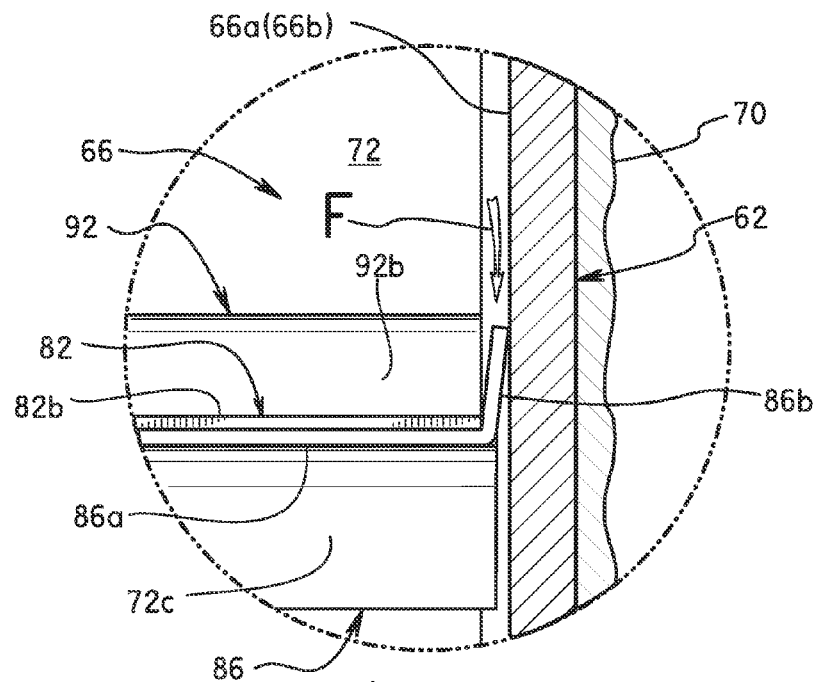
FIG. 27 is a partial enlarged view of selected parts of the rotary fluid damper unit, showing the second secondary flow limiting valve in the flow limiting position that occurs during both a resting state of the inner (first) member and the clockwise rotating state of the inner (first) member.
Figure 28:
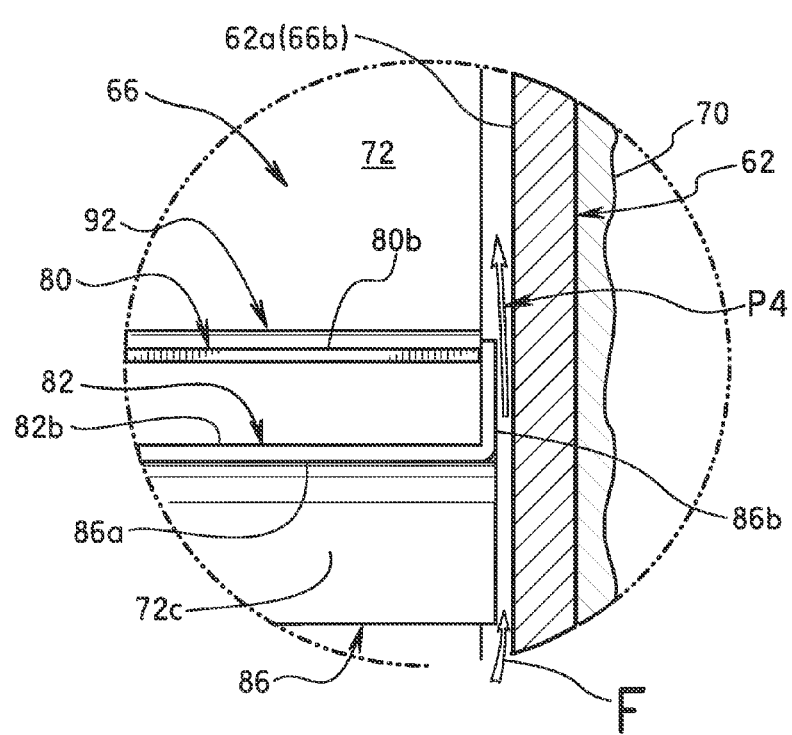
FIG. 28 is a partial enlarged view of selected parts of the rotary fluid damper unit, showing the second secondary flow limiting valve in the non-flow limiting occurring during the clockwise rotating state of the inner (first) member.

In the illustrated embodiment, as seen in FIG. 26, the first secondary flow limiting valve 84 is attached to the first (inner) member 62 to form a first secondary flow path P3 between the first secondary flow limiting valve 84 and the second (outer) member 64. Also in the illustrated embodiment, as seen in FIG. 28, the second secondary flow limiting valve 86 is attached to the second (outer) member 64 to form a second secondary flow path P4 between the second secondary flow limiting valve 86 and the first (inner) member 62. As seen in FIGS. 23 to 28, the third and fourth secondary flow paths P3 and P4 are blocked or substantially blocked by the third and fourth secondary flow limiting valves 84 and 86 being in a non-flexed state. Thus, when the first (inner) member 62 is rotated in the second rotational direction R2, the force F of the fluid in the cavity 66 pushing against the third and fourth secondary flow limiting valves 84 and 86 to block or substantially block the third and fourth secondary flow paths P3 and P4. On the other hand, when the first (inner) member 62 is rotated in the first rotational direction R1, the third and fourth secondary flow limiting valves 84 and 86 are flexed by the fluid pressure F of the fluid to form the third and fourth secondary flow paths P3 and P4.

Figure 19:
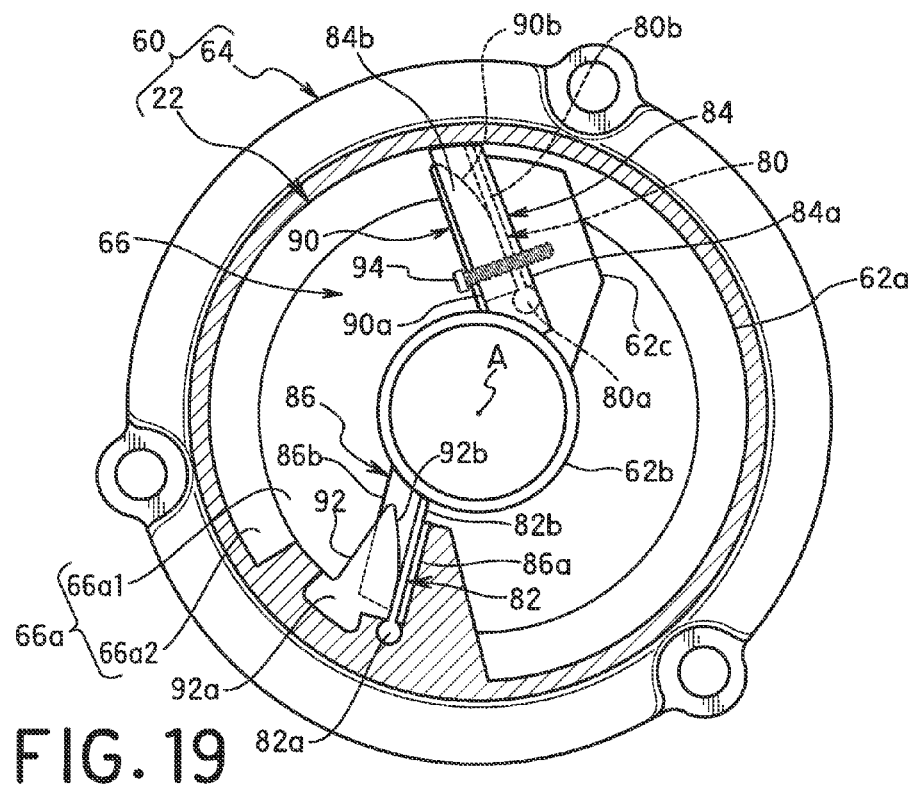
FIG. 19 is a transverse cross sectional view of the rotary fluid damper unit illustrated in FIGS. 7 to 9, but with the inner (first) member of the rotary fluid damper unit rotating in a counter-clockwise direction with respect to the outer (second) member of the rotary fluid damper unit from the position shown in FIG. 10.
Figure 20:
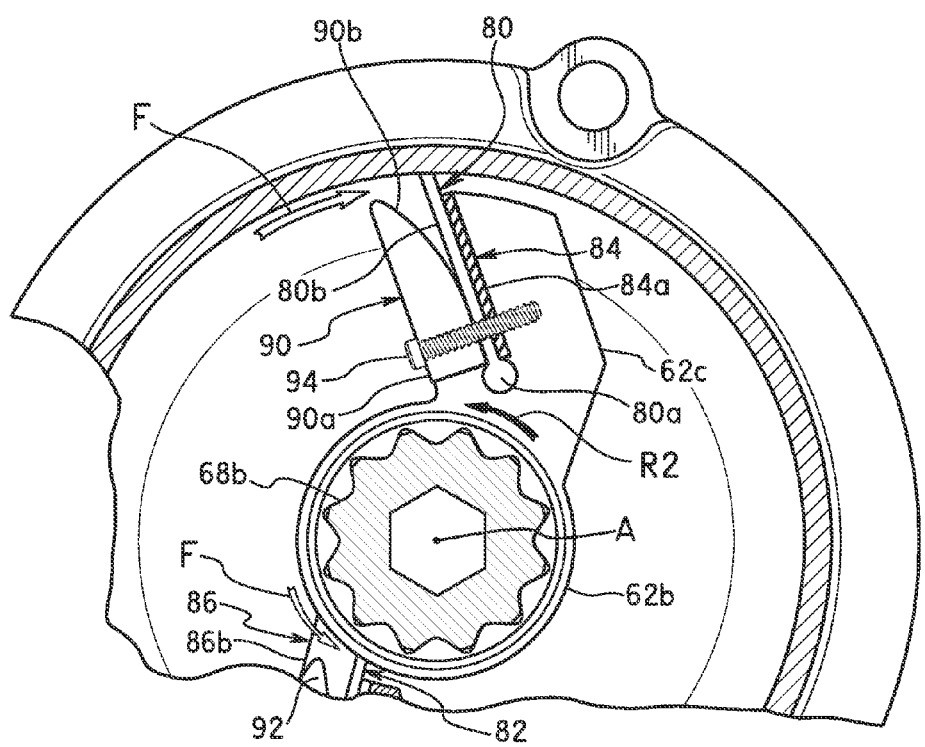
FIG. 20 is a partial enlarged view of selected parts of the rotary fluid damper unit illustrated in FIG. 19, showing the first primary flow limiting valve in the flow limiting position occurring during the counter-clockwise rotating state of the inner (first) member.

As seen in FIGS. 10, 19 and 21, the first primary flow limiting valve 80 and the first secondary flow limiting valve 84 and the second primary flow limiting valve 82 and the second secondary flow limiting valve 86 effectively divide the fluid cavity 66 into two chambers. In this case, the first primary flow limiting valve 80 and the first secondary flow limiting valve 84 act as a movable barrier with respect to the second (outer) member 64. On other hand, the second primary flow limiting valve 82 and the second secondary flow limiting valve 86 act as a stationary barrier with respect to the second (outer) member 64. As the first (inner) member 62 rotates one of the chambers becomes smaller while the other chamber becomes larger. This rotation of the first (inner) member 62 relative to the second (outer) member 64 forces the fluid to flow from one chamber to the other chamber through the flow paths P1, P2, P3 and P4. The size, shape and other characteristics of the flow paths P1, P2, P3 and P4 limit the flow of the fluid from one chamber to another, thereby limiting the rotational speed of first (inner) member 62 relative to the second (outer) member 64. The characteristics of both the fluid and the flow paths P1, P2, P3 and P4 determine how quickly the fluid flows between the chambers and consequently how quickly the chain guide 22 may move and adjust chain tension. For example, for any given fluid, a larger fluid path will allow for quicker fluid flow than a smaller fluid path, allowing for quicker rotation of the chain guide 22. Likewise, for any given fluid path configuration, a less viscous fluid will flow more quickly through the fluid path than a more viscous fluid, allowing for quicker rotation of the guide 22. Other fluid characteristics such as compressibility, and fluid path characteristics such as shape, may affect fluid flow rates and consequently the performance characteristics of the rotary fluid damper unit 24. Accordingly, the damping characteristics of the rotary fluid damper unit 24 can, for example, be initially set by designing the flow paths flow paths P1, P2, P3 and P4 with prescribed sizes and/or shapes and selecting a fluid viscosity to obtain the desired damping characteristics.

In the illustrated embodiment, the at least one support member includes the first support member 90 that is attached to the first (inner) member 62 and the second support member 92 that is attached to the second (outer) member 64. Thus, in the illustrated embodiment, the at least one primary flow limiting valve (i.e., the first primary flow limiting valve 80) and the at least one support member (i.e., the first support member 90) are attached to the first (inner) member 62. Also in the illustrated embodiment, the at least one primary flow limiting valve (i.e., the second primary flow limiting valve 82) and the at least one support member (i.e., the second support member 92) are attached to the second (outer) member 64.

As seen in FIGS. 10 and 19 to 21, the first primary flow limiting valve 80 includes a first primary attachment portion 80a and a first primary flexible valve portion 80b. The first primary attachment portion 80a and the first primary flexible valve portion 80b are integrally formed as a one-piece member from a suitable flexible material that is resilient. Alternatively, the first primary attachment portion 80a and the first primary flexible valve portion 80b can be separate members with only the first primary flexible valve portion 80b being formed of a resilient material. However, forming the first primary attachment portion 80a and the first primary flexible valve portion 80b as separate members will typically increase production costs.

The first primary attachment portion 80a is attached to the first (inner) member 62. In particular, the first primary attachment portion 80a is attached to the valve mounting portion 62c of the first (inner) member 62 by a pair of fasteners 94 such as screws. The first primary flexible valve portion 80b extends from the first primary attachment portion 80a in a cantilever fashion. In particular, the first primary flexible valve portion 80b is arranged to bend or flex against the first support member 90 by the force F of the fluid in the cavity 66 pushing against the first primary flexible valve portion 80b as first (inner) member 62 rotates relative to the second (outer) member 64 about the rotational axis A rotates in the first rotational direction R1. On the other hand, the first primary flexible valve portion 80b is prevented or substantially prevented from bending or flexing by the valve mounting portion 62c supporting the first primary flexible valve portion 80b as first (inner) member 62 rotates relative to the second (outer) member 64 about the rotational axis A in the second rotational direction R2. In this way, the rotary fluid damper unit 24 provides a higher degree of rotational resistance in the second rotational direction R2 than the first rotational direction R1. Here in the illustrated embodiment, the first primary flexible valve portion 80b has a distal free end that contacts the cylindrical side wall 72b (i.e., the outer wall 66c of the fluid cavity 66) when the chain guide 22 is not moving about the rotational axis A. However, the rotary fluid damper unit 24 could be constructed so that the distal free end of the first primary flexible valve portion 80b does not contact the cylindrical side wall 72b when the chain guide 22 is not moving about the rotational axis A. Rather in this alternative embodiment, a gap always exists between the distal free end of the first primary flexible valve portion 80b and the cylindrical side wall 72b. In any case, the distal free end of the first primary flexible valve portion 80b of the first primary flow limiting valve 80 (i.e., the at least one of the primary flow limiting valve) is configured so that the first primary flow path P1 extends in an axial direction with respect to the rotational axis A.

As seen in FIGS. 10, 19 and 21, the second primary flow limiting valve 82 includes a second primary attachment portion 82a and a second primary flexible valve portion 82b. The second primary attachment portion 82a and the second primary flexible valve portion 82b are integrally formed as a one-piece member from a suitable flexible material that is resilient. Alternatively, the second primary attachment portion 82a and the second primary flexible valve portion 82b can be separate members with only the second primary flexible valve portion 82b being formed of a resilient material. However, forming the second primary attachment portion 82a and the second primary flexible valve portion 82b as separate members will typically increase production costs.

The second primary attachment portion 82a is attached to the second (outer) member 64. In particular, the second primary attachment portion 82a is attached to the second (outer) member 64 by press fitting the second primary attachment portion 82a into the valve receiving recess 72c1 of the second outer cover 72. The second primary flexible valve portion 82b extends from the second primary attachment portion 82a in a cantilever fashion. In particular, the second primary flexible valve portion 82b is arranged to bend or flex against the second support member 92 by force of the fluid in the cavity 66 pushing against the second primary flexible valve portion 82b as first (inner) member 62 rotates relative to the second (outer) member 64 about the rotational axis A rotates in the first rotational direction R1. On the other hand, the second primary flexible valve portion 82b is prevented or substantially prevented from bending or flexing by the valve mounting portion 72c supporting the second primary flexible valve portion 82b as first (inner) member 62 rotates relative to the second (outer) member 64 about the rotational axis A in the second rotational direction R2. In this way, the rotary fluid damper unit 24 further provides a higher degree of rotational resistance in the second rotational direction R2 than the first rotational direction R1. Here in the illustrated embodiment, the second primary flexible valve portion 82b has a distal free end that contacts the outer surface of the tubular portion 62b (i.e., an inner wall 66d of the fluid cavity 66) when the chain guide 22 is not moving about the rotational axis A. However, the rotary fluid damper unit 24 could be constructed so that the distal free end of the second primary flexible valve portion 82b does not contact the tubular portion 62b when the chain guide 22 is not moving about the rotational axis A. Rather in this alternative embodiment, a gap always exists between the distal free end of the second primary flexible valve portion 82b and the tubular portion 62b. In any case, the distal free end of the second primary flexible valve portion 82b of the second primary flow limiting valve 82 (i.e., the at least one of the primary flow limiting valve) is configured so that the second primary flow path P2 extends in an axial direction with respect to the rotational axis A.

As seen in FIGS. 10, 23 to 28, the first secondary flow limiting valve 84 includes a first secondary attachment portion 84a and a first secondary flexible valve portion 84b. The first secondary attachment portion 84a and the first secondary flexible valve portion 84b are integrally formed as a one-piece member from a suitable flexible material that is resilient. Alternatively, the first secondary attachment portion 84a and the first secondary flexible valve portion 84b can be separate members with only the first secondary flexible valve portion 84b being formed of a resilient material. However, forming the first secondary attachment portion 84*a* and the first secondary flexible valve portion 84*b* as separate members will typically increase production costs.

The first secondary attachment portion 84*a* is attached to the valve mounting portion 62*c* of the first (inner) member 62 by the fasteners 94. As mentioned above, the fasteners 94 are also used to attach the first primary flow limiting valve 80 to the valve mounting portion 62*c* of the first (inner) member 62 by the fasteners 94. The first secondary flexible valve portion 84*b* is angularly inclined with respect to the first secondary attachment portion 84*a*. The first secondary flow limiting valve 84 (i.e., the at least one of the secondary flow limiting valve) is configured so that the first secondary flow path P4 extends in a radial direction with respect to the rotational axis A. The first secondary flexible valve portion 84*a* is disposed between the first secondary flow limiting valve 84 (i.e., the at least one of the secondary flow limiting valve) and the axial end wall of the other of the first and second members 62 and 64 in an axial direction with respect to the rotational axis A The second secondary flow limiting valve 86 includes a second secondary attachment portion 86*a* and a second secondary flexible valve portion 86*b*. The second secondary attachment portion 86*a* and the second secondary flexible valve portion 86*b* are integrally formed as a one-piece member from a suitable flexible material that is resilient. Alternatively, the second secondary attachment portion 86*a* and the second secondary flexible valve portion 86*b* can be separate members with only the second secondary flexible valve portion 86*b* being formed of a resilient material. However, forming the second secondary attachment portion 86*a* and the second secondary flexible valve portion 86*b* as separate members will typically increase production costs.

The second secondary attachment portion 86*a* is attached to the second (outer) member 64 by press fitting the second secondary attachment portion 86*a* into the recess of the second outer cover 72. The second secondary flexible valve portion 86*b* is angularly inclined with respect to the second secondary attachment portion 86*a*. The second secondary flow limiting valve 86 (i.e., the at least one of the secondary flow limiting valve) is configured so that the second secondary flow path P4 extends in a radial direction with respect to the rotational axis A. The second secondary flexible valve portion 86*a* is disposed between the second secondary flow limiting valve 86 (i.e., the at least one of the secondary flow limiting valve) and the axial end wall of the other of the first and second members 62 and 64 in an axial direction with respect to the rotational axis A.

As seen in FIGS. 10 and 19 to 22, the first support member 90 is one-piece member that is formed of suitable rigid material such as a lightweight metallic material or a reinforced plastic material. As mentioned above, the fasteners 94 are also used to attach the first primary flow limiting valve 80 and the first secondary flow limiting valve 84 to the valve mounting portion 62*c* of the first (inner) member 62 by the fasteners 94. The first support member 90 (i.e., the at least one support member) includes a convex contact surface 90*a* that faces the first primary flow limiting valve 80 (i.e., at least one primary flow limiting valve. The convex contact surface 90*a* is positioned to limit flexing of the first primary flow limiting valve 80 (i.e., at least one primary flow limiting valve towards an open position that establishes the flow path. The first support member 90 includes a fixing portion 90*b* that is attached to the first (inner) member 62. In particular, the first support member 90 is attached to the valve mounting portion 62*c* of the first (inner) member 62 by the fasteners 94.

As seen in FIGS. 10, 19 and 21, the second support member 92 is one-piece member that is formed of suitable rigid material such as a lightweight metallic material or a reinforced plastic material. The second support member 92 (i.e., at least one support member) includes a convex contact surface 92*a* that faces the second primary flow limiting valve 82 (i.e., at least one primary flow limiting valve). The convex contact surface 92*a* is positioned to limit flexing of the second primary flow limiting valve 82 (i.e., at least one primary flow limiting valve) towards an open position that establishes the flow path. The second support member 92 is attached to the second (outer) member 64. In particular, the second support member 92 includes a fixing portion 92*b* that is attached to the second (outer) member 64 by press fitting the fixing portion 92*b* into the support receiving recess 72*c*2 of the second outer cover 72.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the chain tensioning device. Accordingly, these directional terms, as utilized to describe the chain tensioning device should be interpreted relative to a bicycle in an upright riding position on a horizontal surface and that is equipped with the chain tensioning device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A chain tensioning device comprising:
a main body configured to be mounted to a bicycle;
a chain guide pivotally coupled to the main body to rotate around a rotational axis with respect to the main body; and
a rotary fluid damper unit operatively connected between the main body and the chain guide to provide rotational resistance to the chain guide around the rotational axis, the rotary fluid damper unit including:
a housing including a first member fixed to one of the main body and the chain guide, and a second member fixed to the other of the main body and the chain guide, the first member being disposed inside of the second member to define a fluid cavity that is filled with a fluid;
at least one primary flow limiting valve having a primary attachment portion attached to one of the first and second members and a primary flexible valve portion having a non-flexed state and a flexed state: and
at least one support member attached to the one of the first and second members, the at least one support member being located on a circumferential side of the at least one primary flow limiting valve, the primary flexible valve portion of the at least one primary flow limiting valve being configured to flex and contact the at least one support member to form a primary flow path between a free end of the primary flexible valve portion of the at least one primary flow limiting valve and the other of the first and second member, the at least one support member further having a contact surface that is circumferentially spaced from the primary flexible valve in the non-flexed state and disposed to contact and limit flexing of the towards an open position that establishes the flow path.

2. The chain tensioning device according to claim 1, wherein
the contact surface of the at least one support member includes a convex contact surface that faces the at least one primary flow limiting valve.

3. The chain tensioning device according to claim 1, wherein
the second member is fixed to the main body, and
the first member is fixed to the chain guide, the first member being rotatably disposed inside of the second member.

4. The chain tensioning device according to claim 3, wherein
the first member includes a mounting portion that extends outside of the second member in an axis direction of the rotational axis, and
the chain guide is mounted to the mounting portion of the first member.

5. The chain tensioning device according to claim 3, wherein
the at least one primary flow limiting valve and the at least one support member are attached to the first member.

6. The chain tensioning device according to claim 3, wherein
the at least one primary flow limiting valve and the at least one support member are attached to the second member.

7. A chain tensioning device comprising:
a main body configured to be mounted to a bicycle;
a chain guide pivotally coupled to the main body to rotate around a rotational axis with respect to the main body; and
a rotary fluid damper unit operatively connected between the main body and the chain guide to provide rotational resistance to the chain guide around the rotational axis, the rotary fluid damper unit including:
a housing including a first member fixed to one of the main body and the chain guide, and a second member fixed to the other of the main body and the chain guide, the first member being disposed inside of the member to define a fluid cavity that is filled with a fluid;
a first primary flow limiting valve having a first primary attachment portion attached to the first member and a first primary flexible valve portion to form a first primary flow path between the first primary flow limiting valve and the second member, and
a second primary flow limiting valve having a second primary attachment portion attached to the second member and a second primary flexible valve portion to form a second primary flow path between the second primary flow limiting valve and the first member; and
a first support member attached to the first member, the first support member being located on a circumferential side of the first primary flow limiting valve, the first primary flexible valve portion of the first primary flow limiting valve being configured to flex and contact the first support member to form a first primary flow path between a free end of the first primary flexible valve portion of the first primary flow limiting valve and the second member, and
a second support member attached to the second member, the second support member being located on a circumferential side of the second primary flow limiting valve, the second primary flexible valve portion of the second primary flow limiting valve being configured to flex and contact the second support member to form a second primary flow path between a free end of the second primary flexible valve portion of the second primary flow limiting valve and the first member.

8. The chain tensioning device according to claim 1, wherein
the at least one of the primary flow limiting valve is configured so that the primary flow path extends in an axial direction with respect to the rotational axis.

9. A chain tensioning device comprising:
a main body configured to be mounted to a bicycle;
a chain guide pivotally coupled to the main body to rotate around a rotational axis with respect to the main body; and
a rotary fluid damper unit operatively connected between the main body and the chain guide to provide rotational resistance to the chain guide around the rotational axis, the rotary fluid damper unit including:
a housing including a first member fixed to one of the main body and the chain guide, and a second member fixed to the other of the main body and the chain guide, the first member being disposed inside of the second member to define a fluid cavity that is filled with a fluid;
at least one primary flow limiting valve having a primary attachment portion attached to one of the first and second members and a primary flexible valve portion;
at least one support member attached to the one of the first and second members, the at least one support member being located on a circumferential side of the at least one primary flow limiting valve, the primary flexible valve portion of the at least one primary flow limiting valve being configured to flex and contact the at least one support member to form a primary flow path between a free end of the primary flexible valve portion of the at least one primary flow limiting valve and the other of the first and second members; and
at least one secondary flow limiting valve having a secondary attachment portion and a secondary flexible valve portion, the secondary attachment portion is attached to at least one of the primary flow limiting valve and the one of the first and second members, and the secondary flexible valve portion is configured to form a secondary flow path between a free end of the second flexible valve portion of the at least one secondary flow limiting valve.

10. The chain tensioning device according to claim 9, wherein
the secondary flexible valve portion is angularly inclined with respect to the secondary attachment portion.

11. The chain tensioning device according to claim 9, wherein
the at least one of the primary flow limiting valve is configured so that the primary flow path extends in an axial direction with respect to the rotational axis, and
the at least one of the secondary flow limiting valve is configured so that the secondary flow path extends in a radial direction with respect to the rotational axis.

12. The chain tensioning device according to claim 9, wherein
the secondary flexible valve portion is disposed between the at least one primary flow limiting valve and an axial end wall of the other of the first and second members in an axial direction with respect to the rotational axis.

13. The chain tensioning device according to claim 9, wherein
the at least one primary flow limiting valve includes a first primary flow limiting valve attached to the first member to form a first primary flow path between the first primary flow limiting valve and the second member, and a second primary flow limiting valve attached to the second member to form a second primary flow path between the second primary flow limiting valve and the first member; and
the at least one support member includes a first support member attached the first member and a second support member attached the second member.

14. The chain tensioning device according to claim 13, wherein
the at least one second flow limiting valve includes a first secondary flow limiting valve attached the first member to form a first secondary flow path between the first secondary flow limiting valve and the second member, and a second secondary flow limiting valve attached to the second member to form a second secondary flow path between the second secondary flow limiting valve and the first member.

15. The chain tensioning device according to claim 1, further comprising
a biasing element biasing the chain guide in a first rotational direction around the rotational axis with respect to the main body, and
the rotary fluid damper unit provides a higher degree of rotational resistance in a second rotational direction, which is opposite to the first rotational direction.

16. The chain tensioning device according to claim 1, wherein
the chain guide includes at least one pulley.

17. The chain tensioning device according to claim 1, wherein
the main body includes a base member, a movable member and a linkage structure operatively coupled between the base member and the movable member to move the movable member and the chain guide relative to the base member, the rotary fluid damper unit being disposed on the movable member.

* * * * *